(12) United States Patent
Reiss et al.

(10) Patent No.: US 8,571,695 B2
(45) Date of Patent: Oct. 29, 2013

(54) DAISY-CHAINED GAME AUDIO EXCHANGE

(75) Inventors: Jordan Reiss, San Francisco, CA (US); Paul Donovan, Santa Clara, CA (US)

(73) Assignee: AG Acquisition Corporation, San Francisco, CA (US)

( * ) Notice: Subject to any disclaimer, the term of this patent is extended or adjusted under 35 U.S.C. 154(b) by 1312 days.

(21) Appl. No.: 12/047,260

(22) Filed: Mar. 12, 2008

(65) Prior Publication Data

US 2008/0311986 A1    Dec. 18, 2008

Related U.S. Application Data

(60) Provisional application No. 61/036,003, filed on Mar. 12, 2008, provisional application No. 60/894,400, filed on Mar. 12, 2007.

(51) Int. Cl.
*G06F 17/00*    (2006.01)

(52) U.S. Cl.
USPC .......................................................... 700/94

(58) Field of Classification Search
USPC ......... 700/94; 381/119; 369/4; 704/500–504; 463/1, 2, 30, 35, 36, 40–43
See application file for complete search history.

(56) References Cited

U.S. PATENT DOCUMENTS

| | | | |
|---|---|---|---|
| 1,127,161 A | 2/1915 | Baldwin | 381/379 |
| 2,782,423 A | 2/1957 | Eli et al. | 2/209 |
| 4,270,025 A | 5/1981 | Alsup et al. | 179/15.55 R |
| 4,302,635 A | 11/1981 | Jacobsen et al. | 381/371 |
| 4,472,607 A | 9/1984 | Houng | 181/18 |
| 4,554,993 A | 11/1985 | Houng | 181/130 |
| 4,588,868 A | 5/1986 | Bertagna et al. | 381/382 |
| 4,829,571 A | 5/1989 | Kakiuchi et al. | 381/309 |
| 4,965,836 A | 10/1990 | Andre et al. | 381/370 |
| 5,018,599 A | 5/1991 | Dohl et al. | 181/129 |
| 5,035,005 A | 7/1991 | Hung | 2/209 |
| 5,579,430 A | 11/1996 | Grill et al. | 395/2.12 |
| 5,685,775 A | 11/1997 | Bakoglu et al. | 463/41 |
| 5,793,878 A | 8/1998 | Chang | 381/370 |
| 6,016,347 A | 1/2000 | Magnasco et al. | 379/430 |
| 6,069,964 A | 5/2000 | Yang | 381/374 |
| 6,097,809 A | 8/2000 | Lucey et al. | 379/430 |
| 6,183,367 B1 | 2/2001 | Kaji et al. | 463/42 |
| 6,241,612 B1 | 6/2001 | Heredia | 463/42 |

(Continued)

FOREIGN PATENT DOCUMENTS

| | | |
|---|---|---|
| EP | 1638364 | 3/2006 |
| WO | WO 03/103255 | 12/2003 |

OTHER PUBLICATIONS

International Search Report and Written Opinion for Application Serial No. PCT/US2010/058629, dated Jan. 28, 2011, 8 pp.

(Continued)

*Primary Examiner* — Andrew C Flanders
(74) *Attorney, Agent, or Firm* — Bey & Cotropia PLLC

(57) ABSTRACT

A daisy-chainable game exchange facilitates social networking among at least two game consoles by allowing gamers to share audio information, such as voice communication, without having to play the identical game or connect via a local area network or a wide area network such as the Internet. Control of voice communication and game audio information is facilitated to allow gamers to focus better on social networking through a stream of voice communication or to refocus on game play through the stream of game audio information without losing either stream.

17 Claims, 16 Drawing Sheets

(56) References Cited

U.S. PATENT DOCUMENTS

| | | | |
|---|---|---|---|
| 6,295,366 B1 | 9/2001 | Haller et al. | 381/374 |
| 6,466,681 B1 | 10/2002 | Siska, Jr. et al. | 381/372 |
| 6,599,194 B1 | 7/2003 | Smith et al. | 463/30 |
| 6,618,714 B1 * | 9/2003 | Abrahams | 706/45 |
| 6,658,130 B2 | 12/2003 | Huang | 381/384 |
| 6,731,771 B2 | 5/2004 | Cottrell | 381/371 |
| 6,775,390 B1 | 8/2004 | Schmidt et al. | 381/371 |
| 6,868,164 B2 | 3/2005 | Ito et al. | 381/370 |
| 7,082,393 B2 | 7/2006 | Lahr | 704/233 |
| 7,090,582 B2 | 8/2006 | Danieli et al. | 463/35 |
| 7,181,037 B2 | 2/2007 | Birch | 381/375 |
| 7,371,175 B2 | 5/2008 | Gilboy et al. | 463/35 |
| 7,458,894 B2 | 12/2008 | Danieli et al. | 463/42 |
| 8,475,279 B2 * | 7/2013 | Danieli et al. | 463/42 |
| 2002/0110246 A1 | 8/2002 | Gosior et al. | 381/2 |
| 2002/0131616 A1 | 9/2002 | Bronnikov et al. | 381/370 |
| 2002/0196960 A1 | 12/2002 | Pham et al. | 381/370 |
| 2004/0132509 A1 | 7/2004 | Glezerman | 455/575.2 |
| 2004/0213427 A1 | 10/2004 | Yoon | 381/370 |
| 2005/0003892 A1 | 1/2005 | Cheng et al. | 463/35 |
| 2005/0007500 A1 * | 1/2005 | Lin et al. | 348/790 |
| 2005/0181872 A1 | 8/2005 | Acharya et al. | 463/35 |
| 2006/0062417 A1 | 3/2006 | Tachikawa | 381/378 |
| 2006/0256992 A1 | 11/2006 | Liao | 381/371 |
| 2007/0064969 A1 | 3/2007 | Chou | 381/381 |
| 2007/0093279 A1 | 4/2007 | Janik | 455/569.1 |
| 2007/0183616 A1 | 8/2007 | Wahl et al. | 381/370 |
| 2007/0261153 A1 | 11/2007 | Wise et al. | 2/423 |
| 2008/0152160 A1 * | 6/2008 | Chew et al. | 381/71.6 |
| 2008/0311986 A1 | 12/2008 | Reiss et al. | 463/35 |
| 2009/0252355 A1 | 10/2009 | Mao | 381/309 |

OTHER PUBLICATIONS

Fibush, David K., "Integrating Digital Audio Into the Serial Digital Video Signal," SMPTE Journal, pp. 574-579, Sep. 1994.

Press Release, "Xbox Turns Up the Volume on the Future of Video Games" [online], May 20, 2001 [retrieved on Apr. 8, 2010], 2 pp., Retrieved From the Internet: http://www.microsoft.com/presspass/press/2002/may02/05-20e3brie . . . .

Turtle Beach, "New Gaming Headphones Provide Amplification of Game Audio and Xbox Live Chart" [online], Oct. 8, 2006 [retrieved on Apr. 8, 2010], 1 p., Retrieved From the Internet: http://www.turtlebeach.com/releases/20061008/Ear-Force-X1-Xbo . . . .

Turtle Beach, "First Wireless Headphone for Xbox 360 with Independent Volume Control of Amplified Chat and Game Audio" [online], Aug. 22, 2007 [retrieved on Apr. 8, 2010], 2 pp., Retrieved From the Internet: http://www.turtlebeach.com/releases/20070822/Turtle-Beach-Annou . . . .

Fibush, D.K., "Integrating Digital Audio Into the Serial Digital Video Signal," SMPTE [Society of Motion Picture and Television Engineers] Journal, Sep. 1994, pp. 574-579.

"First Wireless Headphone for Xbox 360 With Independent Volume Control of Amplified Chat and Game Audio," Turtle Beach®, Elmsford, N.Y., Aug. 22, 2007, <http://www.turtlebeach.com/releases/20070822/Turtle-Beach-Announces-X3-Wireless-Gaming-Headphones-For-Xbox-360.aspx> [retrieved Apr. 8, 2010], 2 pages.

"New Gaming Headphones Provide Amplification of Game Audio and Xbox Live Chat," Turtle Beach®, Elmsford, N.Y., Oct. 8, 2006, <http://www.turtlebeach.com/releases/20061008/Ear-Force-X1-Xbox-Gaming-Headphones.aspx> [retrieved Apr. 8, 2010], 1 page.

"Xbox Turns Up the Volume on the Future of Video Games," Microsoft® News Center, Press Release, May 2, 2002, <http://www.microsoft.com/presspass/press/2002/may02/05-20e3briefingpr.mspx> [retrieved Apr. 8, 2010], 2 pages.

"Zehn Kopfhorer-Mikrofon-Sets im Vergleich," Computer Bild, Oct. 17, 2007 [retrieved on Mar. 2, 2009], pp. 2-12, http://www.computerbild.de/artikel/cbs-Tests-Hardware-Zehn-Kopfhoerer-Mikrofon-Sets-im-Vergleich-1873070.html.

International Search Report for Application Serial No. PCT/US2008/087280, dated Jul. 15, 2009.

* cited by examiner

DAISY-CHAINED GAME AUDIO EXCHANGE

CROSS-REFERENCES TO RELATED APPLICATIONS

This application claims the benefit of U.S. Provisional Patent Application No. 60/894,400, filed Mar. 12, 2007, and U.S. Provisional Patent Application No. 61/036,003, filed Mar. 12, 2008, all of which are incorporated herein by reference.

BACKGROUND

Evolution of gaming has created the need for more advanced voice communications. Current gaming consoles provide poor voice communications experience due to delay and lack of quality. A gamer wishing to utilize a headset to play without disturbing others wants better audio experience. In addition, the gamer often plays with teammates and/or a coach in close physical proximity and wants to have the ability to communicate with these teammates/coaches through a separate and secure voice channel with zero lag and high voice quality. Stored on a music player, digital music that would enhance gaming experience cannot currently be accessed. Integrating various audio sources for gamers of personal game consoles would enhance the gaming experience.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In accordance with one aspect of this invention, a system form of the invention includes a daisy-chainable game audio exchange which comprises a compression circuit for compressing or expanding a voice signal coming from a microphone of an audio gear of a gamer to produce a first summand signal. The daisy-chainable game audio exchange further comprises social networking circuitry to combine the first summand signal, audio information as a second summand signal coming from a leftward daisy chain network that is neither a local area network nor a wide area network, and audio information as a third summand signal coming from a rightward daisy chain network, to produce a combined voice signal.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Modern game consoles are designed for a personal gaming experience, and over time such an experience becomes more isolating. Various embodiments of the present invention facilitate social networking among at least two game consoles by allowing gamers to share audio information, such as voice communication, without having to play the identical game or connect via a local area network or a wide area network such as the Internet. Various embodiments of the present invention allow control of voice communication and game audio information so as to allow gamers to better focus on the social networking through a stream of voice communication or to refocus on game play through the stream of game audio information without losing either stream.

Figure 1:
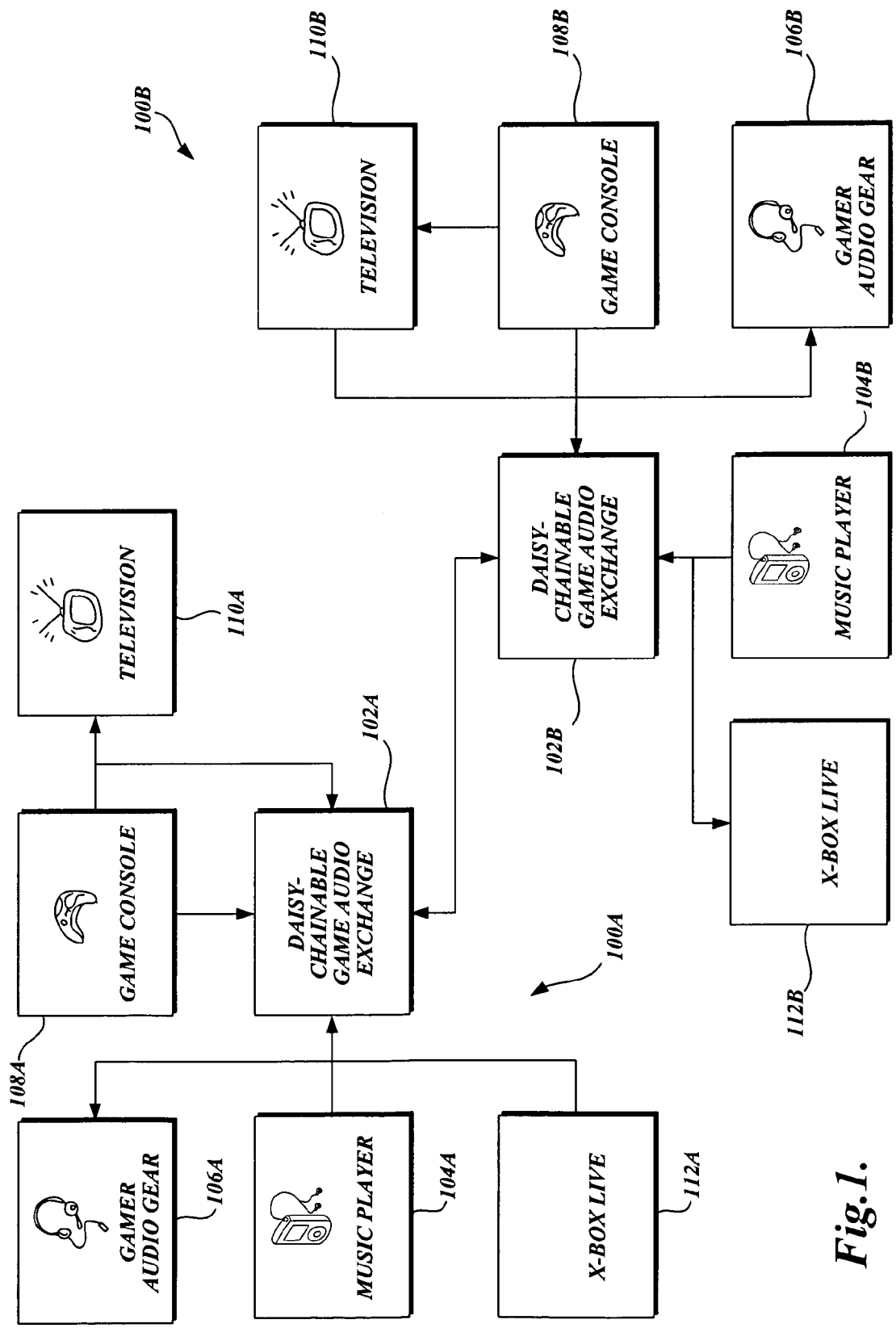
FIG. 1 is a block diagram illustrating the interlinkage of exemplary pieces of gaming hardware via exemplary daisy-chainable game audio exchanges.

FIG. 1 illustrates exemplary systems 100a, 100b where audio information is exchanged between two daisy-chainable game audio exchanges 102a, 102b. A number of personal game consoles 108a, 108b are coupled to both television sets 110a, 110b as well as to the daisy-chainable game audio exchanges 102a, 102b. These personal game consoles 108a, 108b are specialized computers built for playing games and can be controlled by various input devices, such as trackballs, buttons, and triggers. Games playable on these personal game consoles 108a, 108b attempt to give players the experience of actually being in a virtual environment, setting, or situation.

The television sets 110a, 110b which are coupled to the personal game consoles 108a, 108b, operate as audiovisual output devices for these game consoles. Modern television sets 110a, 110b include various jacks, which are female fittings coupled to electronic circuitry inside the television sets 110a, 110b to process audio and video information. Several of the jacks available on each of the television sets 110a, 110b mate with a plug of an audio cable, whether an RCA cable or a 3.5 mm variety, to couple a television set 110a, 110b to a jack selected from a set of jacks on the daisy-chainable game audio exchange 102a, 102b. The remaining jacks of the daisy-chainable game audio exchanges 102a, 102b are female fittings ready to receive plugs from personal game consoles 108a, 108b; gamer audio gears 106a, 106b; and music players 104a, 104b. These audio gear sets 106a, 106b include headphones coupled to a microphone so that a gamer can listen both to audio information provided by personal game consoles 108a, 108b and audio information from music players 104a, 104b, as well as to audio communications by the gamers transmitted via microphones to the daisy-chainable game audio exchanges 102a, 102b. Various embodiments of the present invention allow Xbox LIVE equipment 112a, 112b, constituting an online multiplayer gaming and digital media delivery service created and operated by Microsoft Corporation, to transmit voice communication over a wide area network into the daisy-chainable game audio exchange 102a, 102b. In these embodiments, the daisy-chainable game audio exchange 102a, 102b may facilitate transmission of audio information containing both voice and game audio information, which is received by the Xbox LIVE equipment 112a, 112b.

Various embodiments of the present invention aurally link audio information from gamers, game audio information, and information from music players 104a, 104b so that these pieces of information can be redistributed to other gamers whose personal game consoles 108a, 108b are not necessarily networked via a local area network or a wide area network. A number of knobs (not shown in FIG. 1) are provided on the daisy-chainable game audio exchanges 102a, 102b to allow gamers to adjust the balance and loudness level of various pieces of audio information. For example, set-up knobs allow a gamer to specify how much of the audio information coming from the personal game console 108a, 108b and how much of the audio information coming from various microphones are to be represented to the headphones of the gamer audio gear 106a, 106b.

Figure 11:
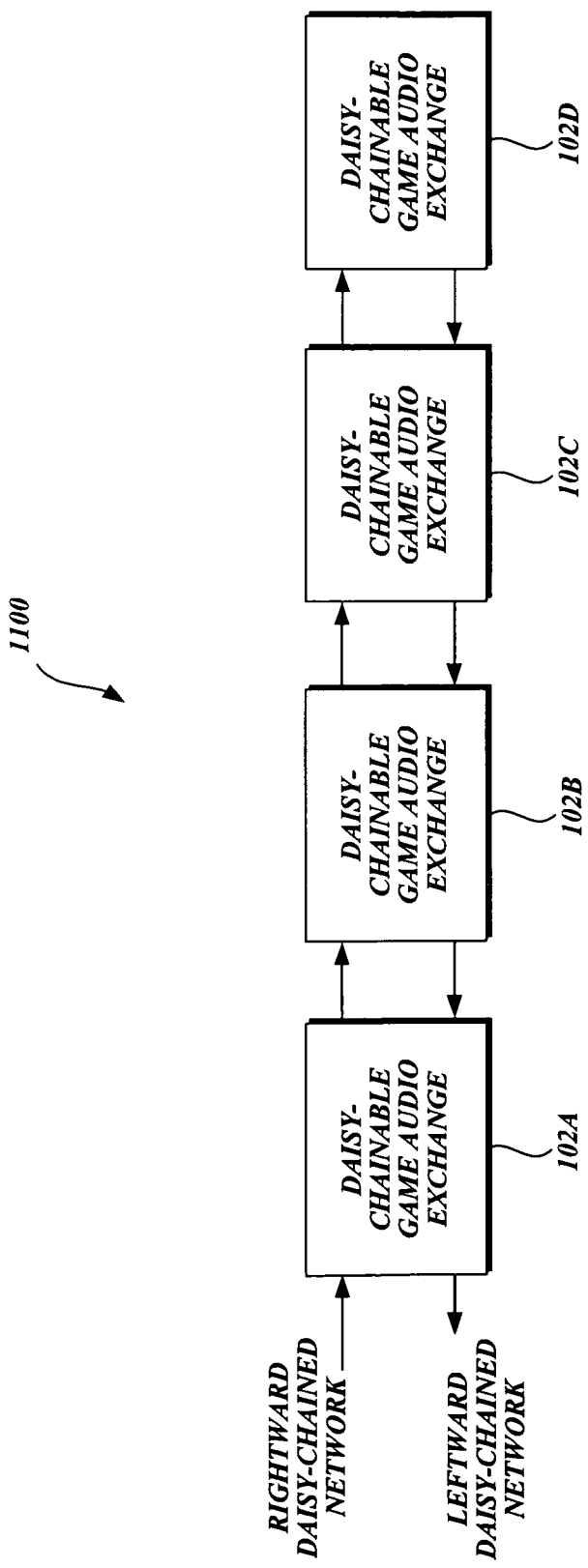
FIG. 11 is a block diagram illustrating an exemplary daisy-chained network.

FIG. 11 illustrates a daisy-chain network 1100. The network includes the daisy-chainable game audio exchanges 102a-102d, which are electrically coupled to each other. Audio information from the left of each daisy-chainable game audio exchange is combined with voice signal, coming from a microphone of a gamer's audio gear, and is presented to the right of each daisy-chainable game audio exchange. Audio information from the right of each daisy-chainable game audio exchange is combined with voice signal, coming from the microphone of a gamer's audio gear, and is presented to the left of each daisy-chainable game audio exchange. Thus, the daisy-chain network 1100 comprises a leftward daisy-chain network and a rightward daisy-chain network.

Figure 2:
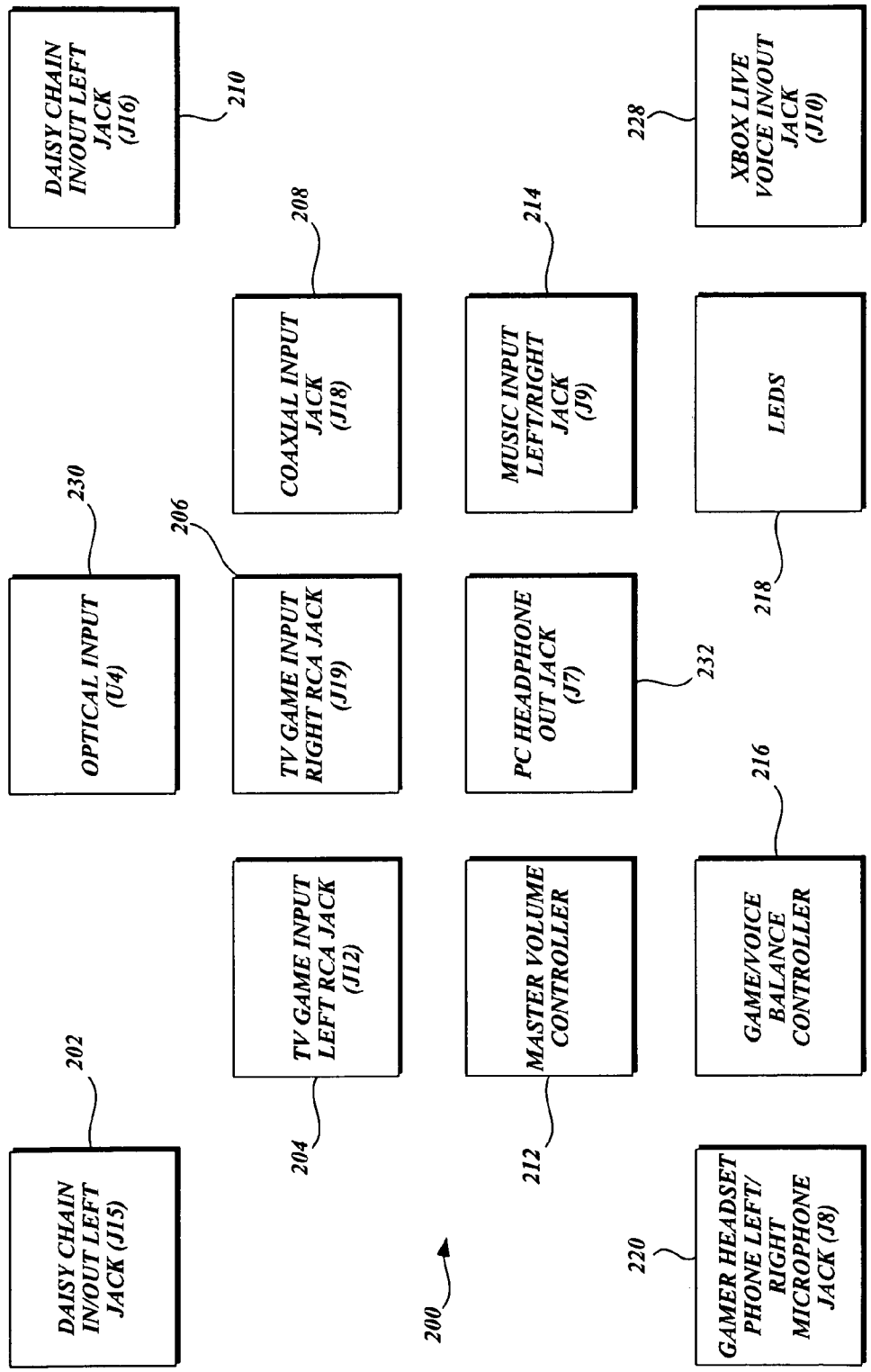
FIG. 2 is a block diagram illustrating exemplary jacks and controllers for an exemplary daisy-chainable game audio exchange.

FIG. 2 illustrates a system 200 showing connectors for facilitating audio inputs, outputs, and controllers in accordance with various embodiments of the present invention. The system 200 includes a daisy chain left connector 202 (jack J15) for facilitating input and output of audio information. Preferably, the connector 202 is suitably assembled from a 3.5 mm, three-pole jack. A TV game left connector 204 (jack J12) for facilitating input audio information is preferably formed from an RCA jack. A TV game right connector 206 (jack J19) for facilitating audio input is preferably formed from an RCA jack. Another TV game coaxial input connector 208 (jack J18) for facilitating both left audio input information as well as right audio input information is preferably formed from a 3.5 mm jack, which is three-pole. A daisy chain right connector 210 (jack J16) for facilitating input and output of right audio information is preferably formed from a 3.5 mm, three-pole jack.

A master volume controller 212 is provided so as to allow the loudness or the degree of intensity of sound to be controlled. A music left/right connector 214 (jack J9) for facilitating input of digital music encoded using various suitable schemes, such as mp3, is preferably formed from a 3.5 mm, three-pole jack. A game/voice balance controller 216 is provided to allow adjustment of the balance of either game audio information or voice information and vice versa. A number of LEDs 218 are provided, allowing visual confirmation of whether power is on or off and whether the power is at a low state. A gamer headset left/right connector 220 for facilitating microphone information is preferably formed from a 3.5 mm, five-pole jack. In one embodiment, connector 228 (jack J10) is also provided to couple to audio information from the Xbox LIVE equipment, which is preferably formed from a 2.5 mm, three-pole jack. In other embodiments, the connector 228 (jack J10) can receive audio from any sources of audio signals, such as a smart mobile phone. An optical input connector 230 (circuit U4) facilitates information directly from a game console. A PC headphone output connector 232 (jack J7) receives output audio information coming from the daisy-chainable game audio exchange 102a, 102b.

Figure 3A:
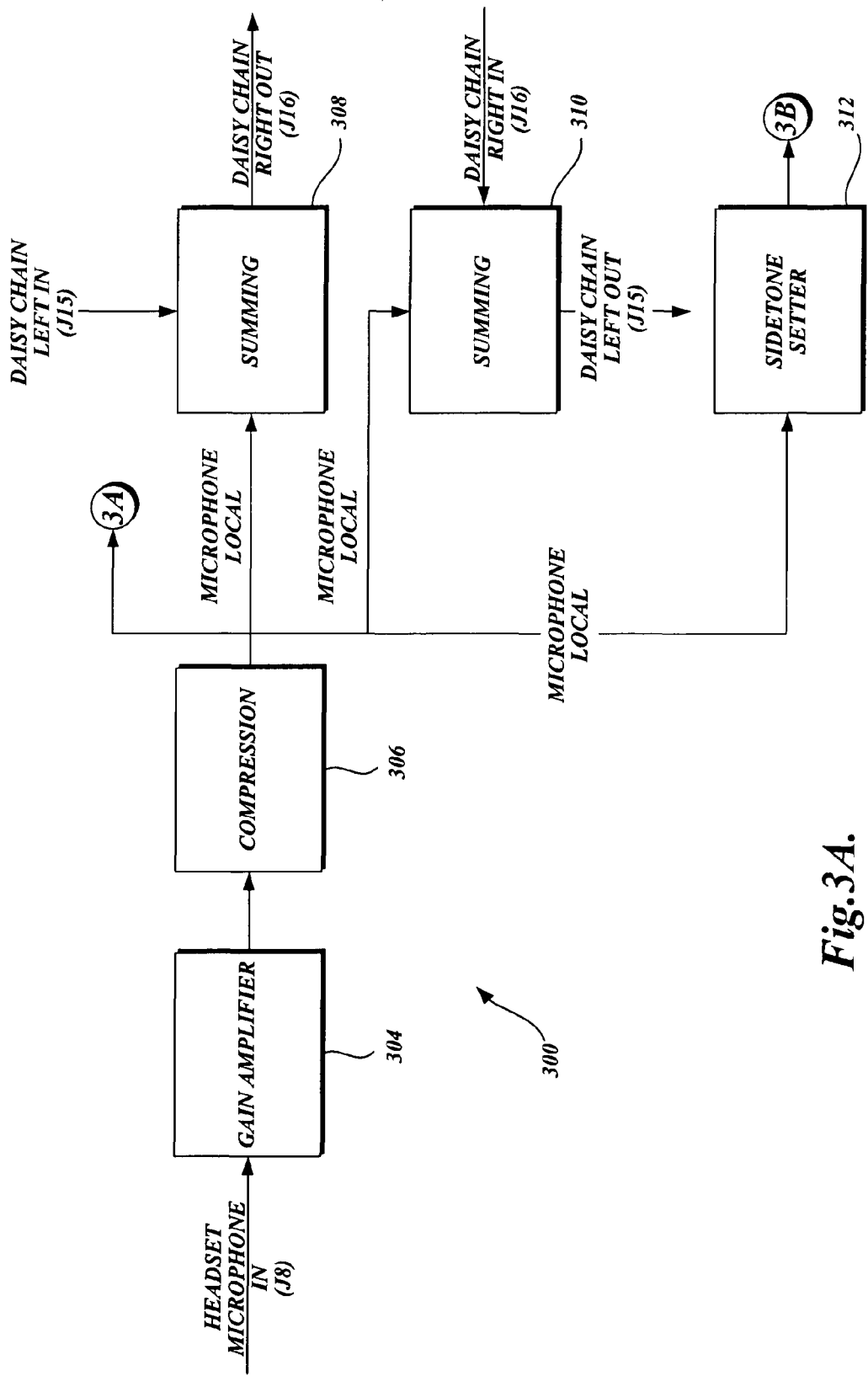
FIGS. 3A-3B are block diagrams illustrating exemplary signals and pieces of hardware connected with an exemplary game audio exchange.
Figure 3B:
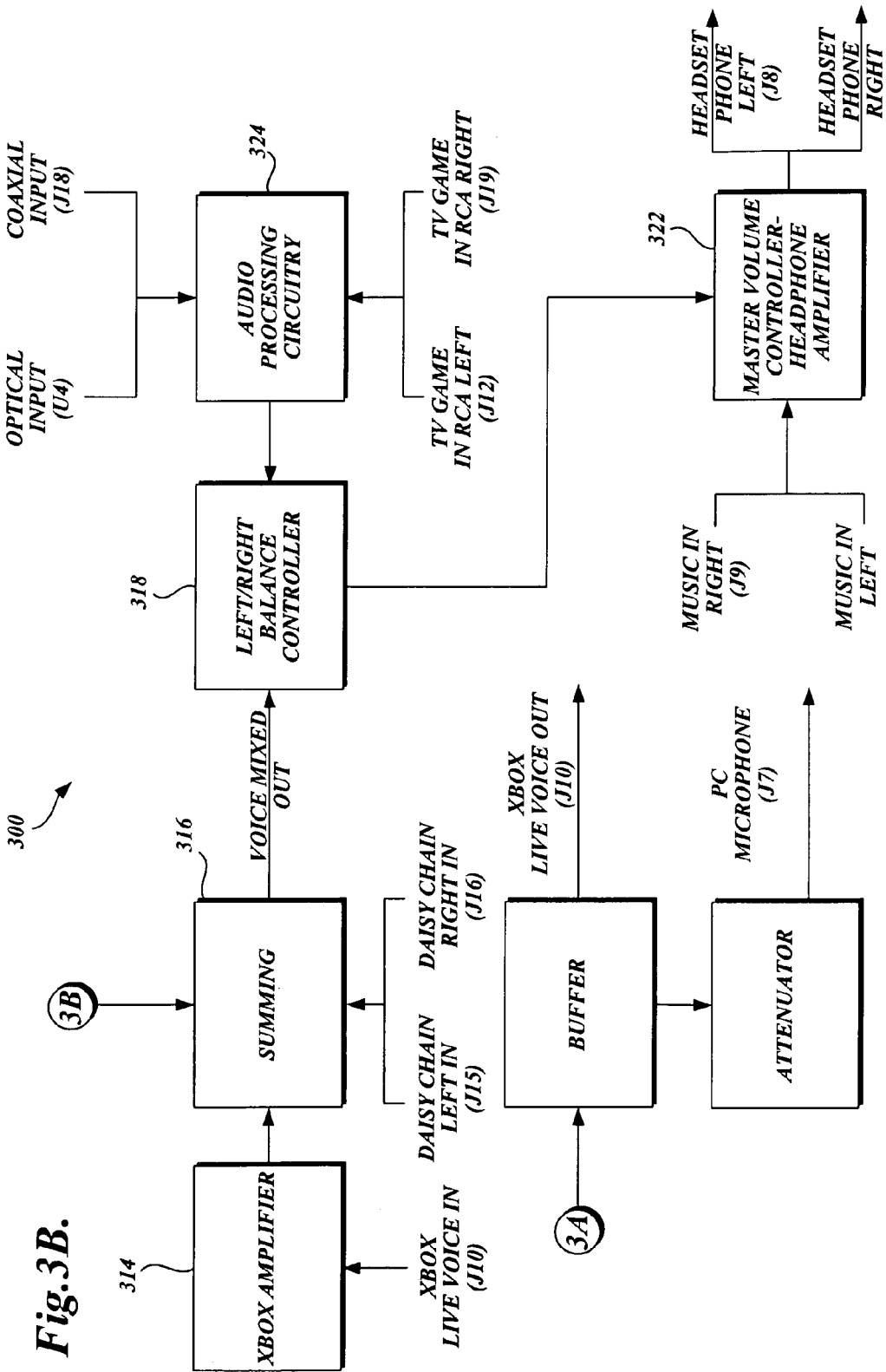

FIGS. 3A, 3B illustrate a system 300 showing high level functionalities for processing audio information in accordance with various embodiments of the present invention. Voice information from the microphone of the gamer audio gear 106a, 106b is received at jack J8. Next, voice information enters a gain amplifier 304, which provides amplitude gain to the voice information and then subsequently provides it to a compression circuit 306. The compression circuit 306 produces either a compressed or expanded audio signal, which nomenclature includes a microphone local signal. The microphone local signal is provided to three circuits: a summing circuit 308, a summing circuit 310, and a sidetone setter 312. The summing circuit 308 also receives a daisy chain left-in signal coming from the connector 202. The summing circuit 308 produces a daisy chain right-out signal, which is provided at the connector 210. The summing circuit 310 receives a daisy chain right-in signal coming from the connector 210 to produce a daisy chain left-out signal, which is provided at the connector 202. The sidetone setter 312 allows adjustment of the intensity of the loudness of the effective sound that is picked up by the microphone of the gamer audio gear 106a, 106b and deliberately introduced at a low level into the headset of the gamer audio gear 106a, 106b so as to provide some feedback that the gamer audio gear 106a, 106b is working. The signal produced by the sidetone setter 312 continues at node 3b.

An Xbox LIVE voice-in signal is taken from the connector 228 and is presented to a Xbox amplifier 314, which processes the Xbox LIVE voice-in signal to give it some gain, such as 6 dB. The signal is then presented at a summing circuit 316 in addition to the audio signal coming from node 3b, as well as the daisy chain left-in signal coming from the connector 202, as well as the daisy chain right-in signal coming from the connector 210. The summing circuit 316 produces a processed signal, which has a nomenclature of voice mixed-out signal, and is presented to a left/right balance controller 318. Audio signals are input into an audio processing circuitry 324, which is electrically coupled to the left/right balance controller 318, including a TV game in-left signal and the TV game in-right signal received from the coaxial connector 208; a TV game in-RCA left signal, which is received from the connector 204; the TV game in-RCA right signal, which is received from the connector 206; and the optical signal from the optical input 230. The left/right balance controller 318 presents the processed audio information to a master volume controller and headphone amplifier circuit 322, which allows the intensity of the loudness of the audio signal to be processed. A music in-left signal and a music in-right signal coming from the connector 214 are also presented to the circuit 322. The audio signal is processed by the headphone amplifier circuit portion of the circuit 322, which reproduces as a headset phone left signal and a headset phone right signal, both of which are presented at the connector 220.

Figure 4A:
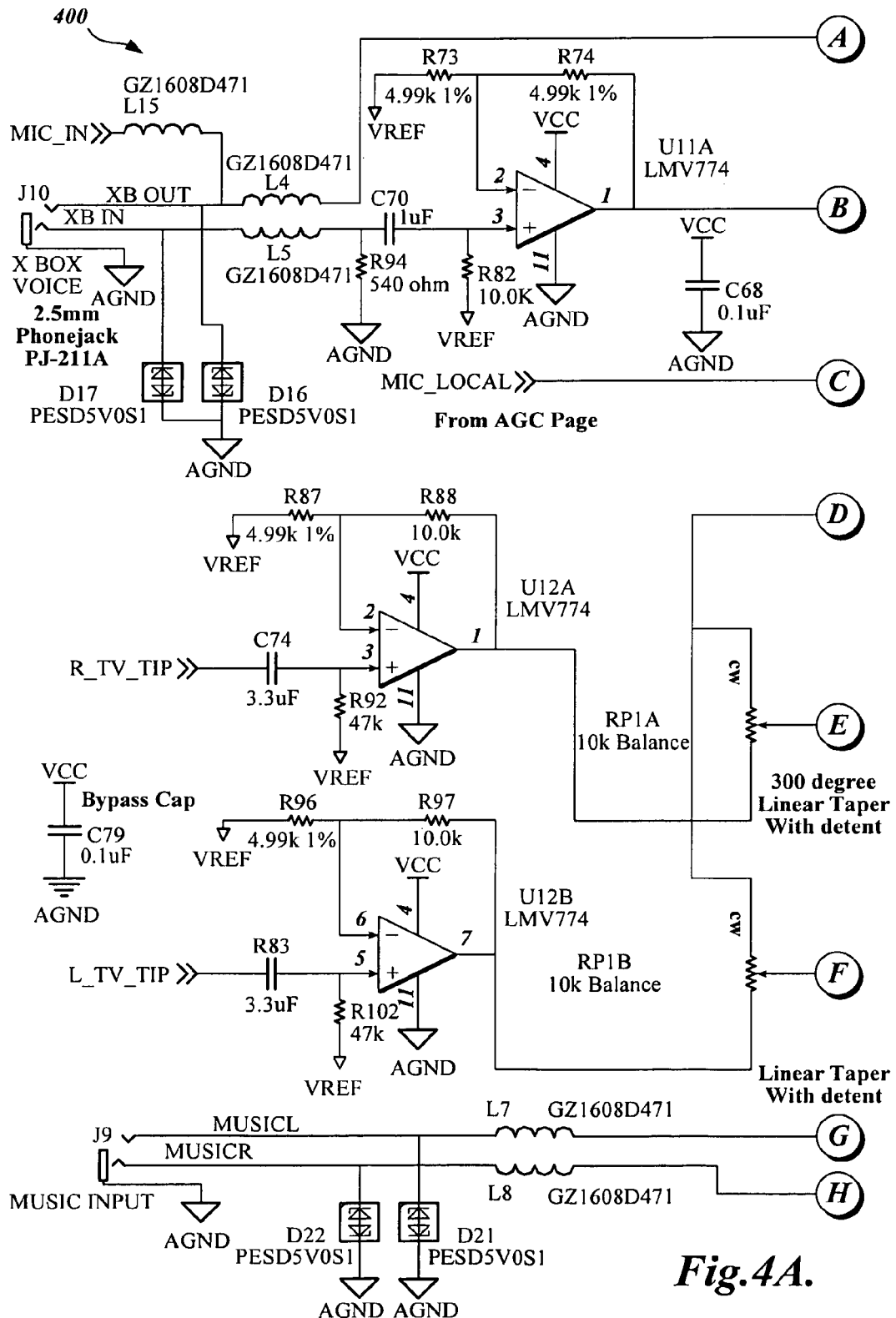
FIG. 4 is a circuit diagram illustrating exemplary mixing circuitry.
Figure 4B:
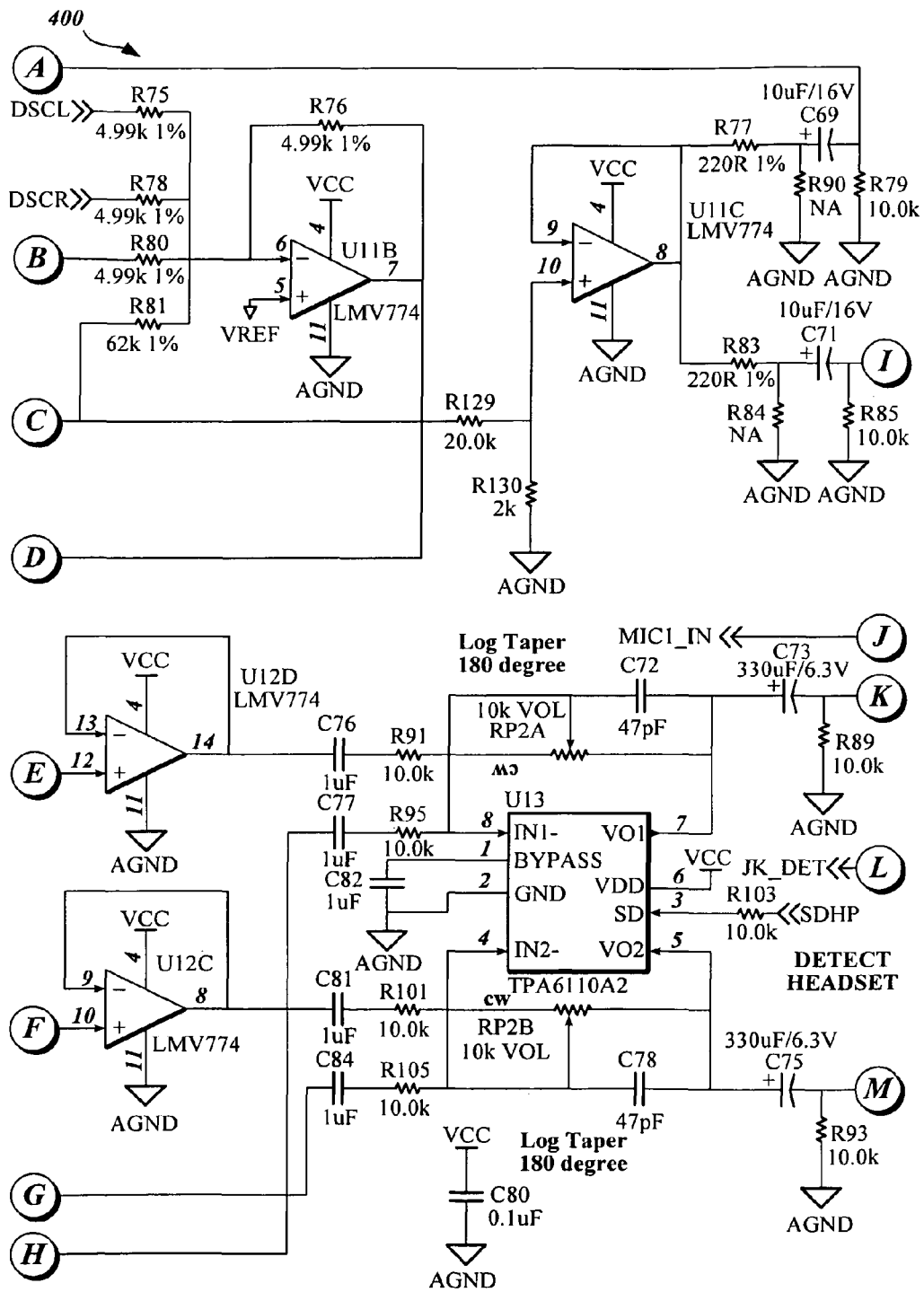
Figure 4C:
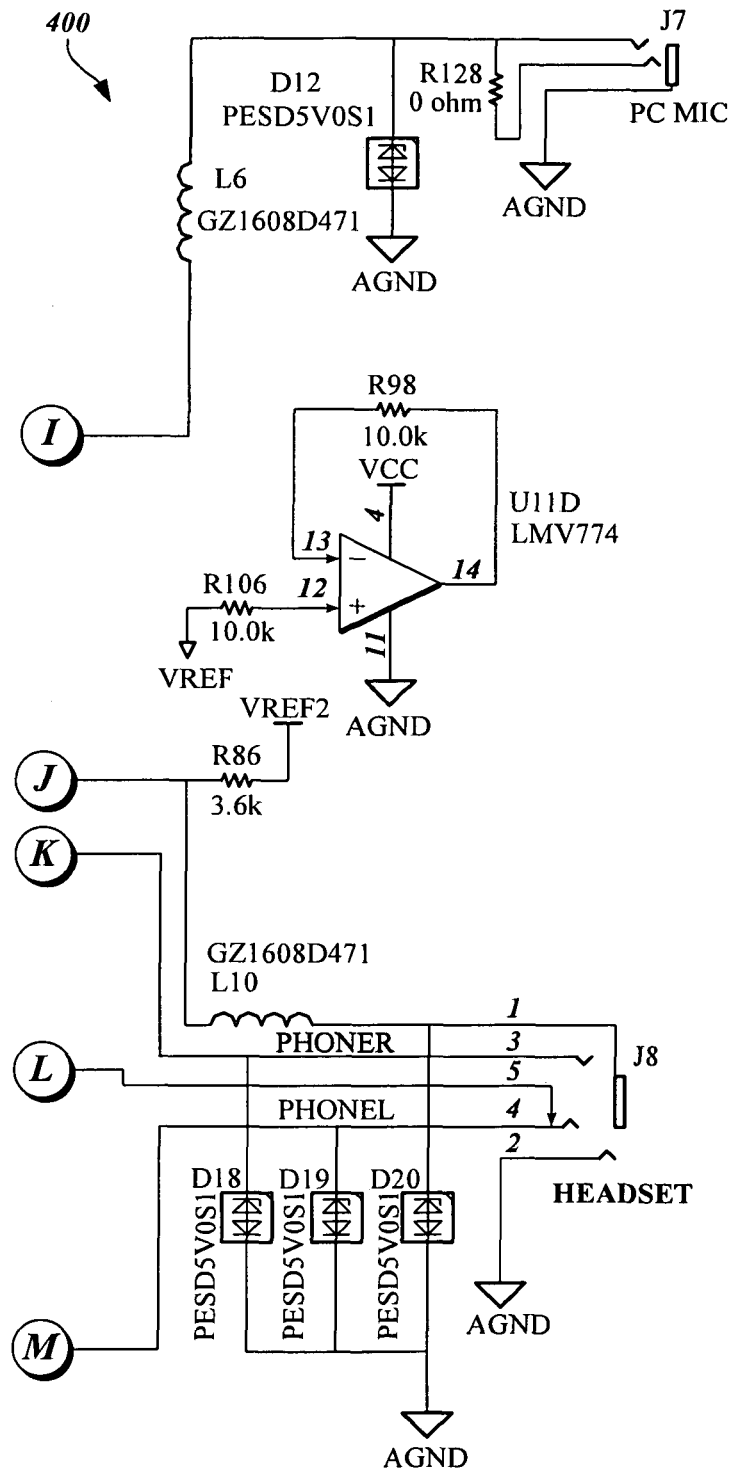

FIG. 4 illustrates an exemplary circuit 400 that facilitates a social network channel in which audio information from gamers playing independent, separate, and distinct game consoles that are daisy-chained together with game audio information so that pieces of audio information can be redistributed to other gamers playing on the independent, separate, and distinct game consoles. The circuit 400 includes jack J8, which is a female fitting, coupled to the electric circuit 400 used with multiple plugs to make a connection with another circuit. Jack J8 is a 5-pin jack that can be mated with plugs coupled to a headset of the gamer audio gear 106a, 106b. Pin 1 of the jack J8 receives current that represents audio information coming from the microphone of the gamer audio gear 106a, 106b. Pin 1 presents the current to an inductor L10, which may have any suitable Henry value and which acts to squelch spurious noise on the current. One suitable inductor includes Industry Part No. GZ1608D471. A second port of the inductor L10 is coupled to a first port of a resistor R86, which suitably includes a value of about 3.6 kilo-ohms. Taken from the first port of the resistor R86 is a signal having the nomenclature MIC1_IN, which represents a current containing audio information for further processing at subsequent circuitry stages. The second port of the resistor R86 is coupled to a second reference voltage source VREF2. The second reference voltage VREF2 is about 6 V and is used for circuitry not directly related to audio circuitry so as to inhibit noise that could be introduced into the audio circuitry.

Figure 5:
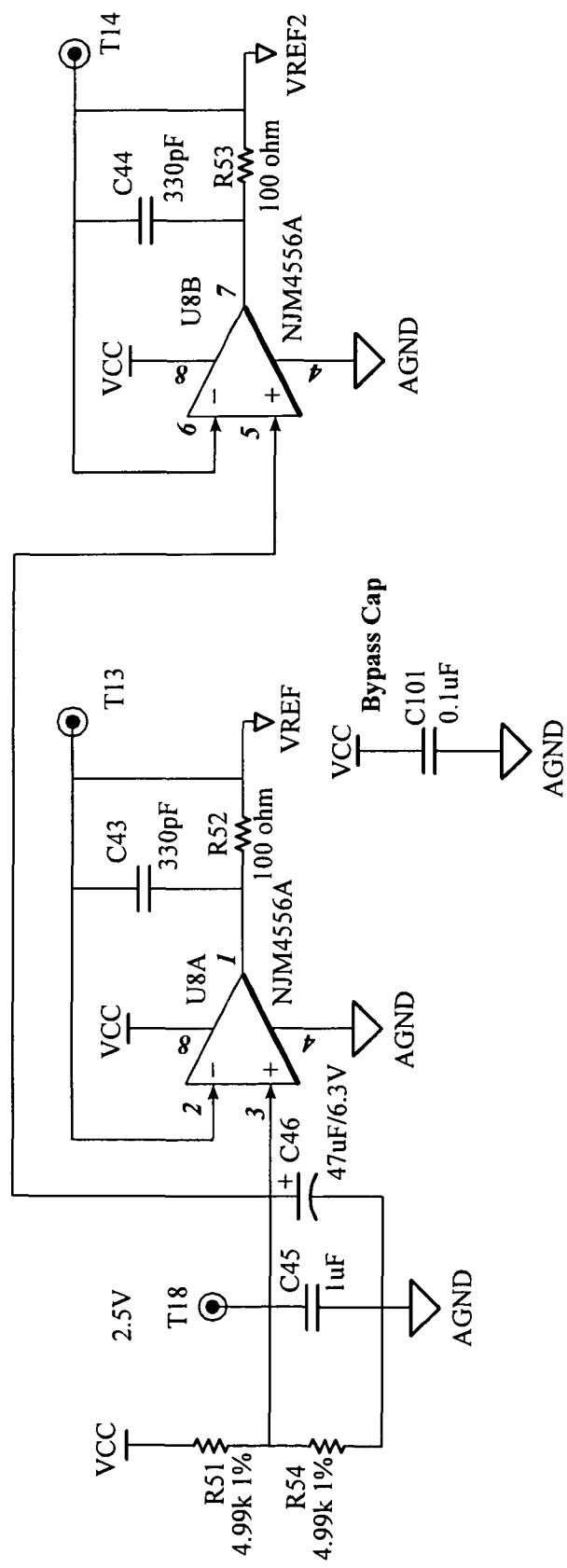
FIG. 5 is a circuit diagram illustrating exemplary center reference circuitry.

Digressing, FIG. 5 illustrates a circuit 500 for producing two center voltage references for subsequent audio processing circuitry in the systems 100a, 100b. A suitable voltage source VCC, such as a 12-volt source, is coupled to a first port of a resistor R51, which suitably includes a value of about 4.99 kilo-ohms. A second port of the resistor R51 is electrically coupled to a first port of a resistor R54, as well as a first plate of a capacitor C46. The resistor R54 suitably includes a value of about 4.99 kilo-ohms and a second port is coupled to analog ground. Also coupled to analog ground is a second plate of the capacitor C46, which suitably includes a value of about 47 microfarads. Electrically coupled to the first plate of the capacitor C46 is pin 3 of an operational amplifier U8A, which is a positive input and is electrically coupled to pin 5 of an operational amplifier U8B, which is also a positive input. Any suitable operational amplifier can be used for both operational amplifiers U8A, U8B, such as Industry Part No. NJM4556A. Pin 4 of both operational amplifiers U8A, U8B is coupled to analog ground. Pin 2, which is a negative input of the operational amplifier U8A, is coupled to a first plate of a capacitor C43, which suitably includes a value of about 300 picofarads. Pin 8 of the operational amplifier U8A is coupled to the VCC voltage source. A second plate of the capacitor C43 is coupled to pin 1 or the output of the operational amplifier U8A, as well as to a first port of a resistor R52, which suitably includes a value of about 100 ohms. The voltage presented at the second port of the resistor R52 is the center reference voltage VREF, about 6 volts. This center reference voltage VREF is typically used for audio circuitry that is particularly sensitive to spurious noise.

Pin 6 of the operational amplifier U8B is coupled to a first plate of a capacitor C44, which suitably includes a value of about 330 picofarads. Pin 8 of the operational amplifier U8B is coupled to the reference voltage VCC. A second plate of the capacitor C44 is coupled to pin 7 of the operational amplifier U8B, which is the output of the operational amplifier and is electrically coupled to a first port of a resistor R53, which suitably includes a value of about 100 ohms. A second port of the resistor R53 presents the second center reference voltage VREF2, which is used for circuitry not directly related to audio circuitry so as to inhibit noise that could be introduced.

Figure 6A:
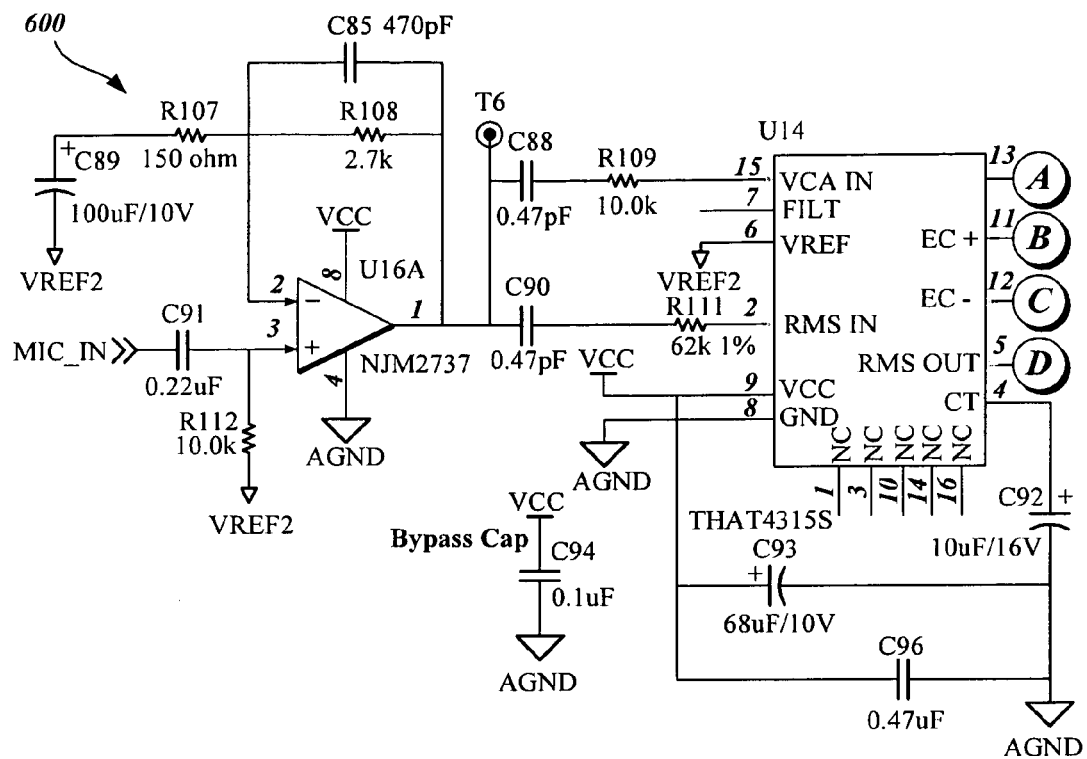
FIG. 6 is a circuit diagram illustrating exemplary automatic gain control circuitry.
Figure 6A:
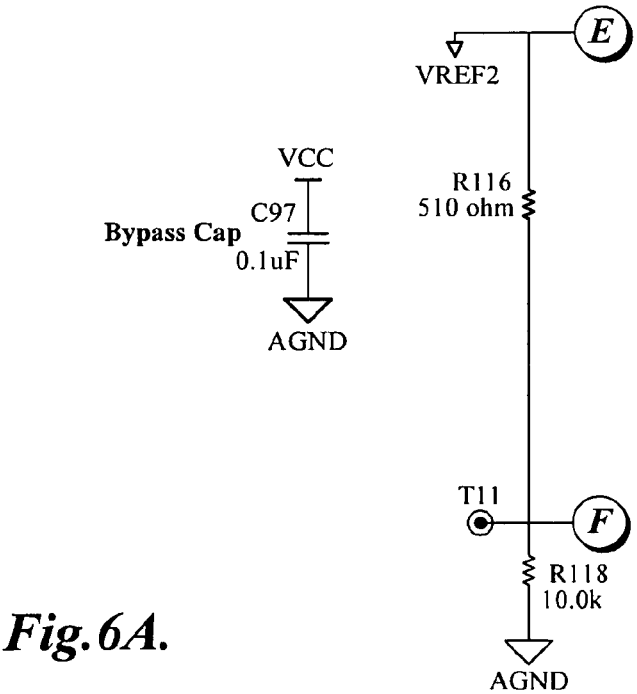
Figure 6B:
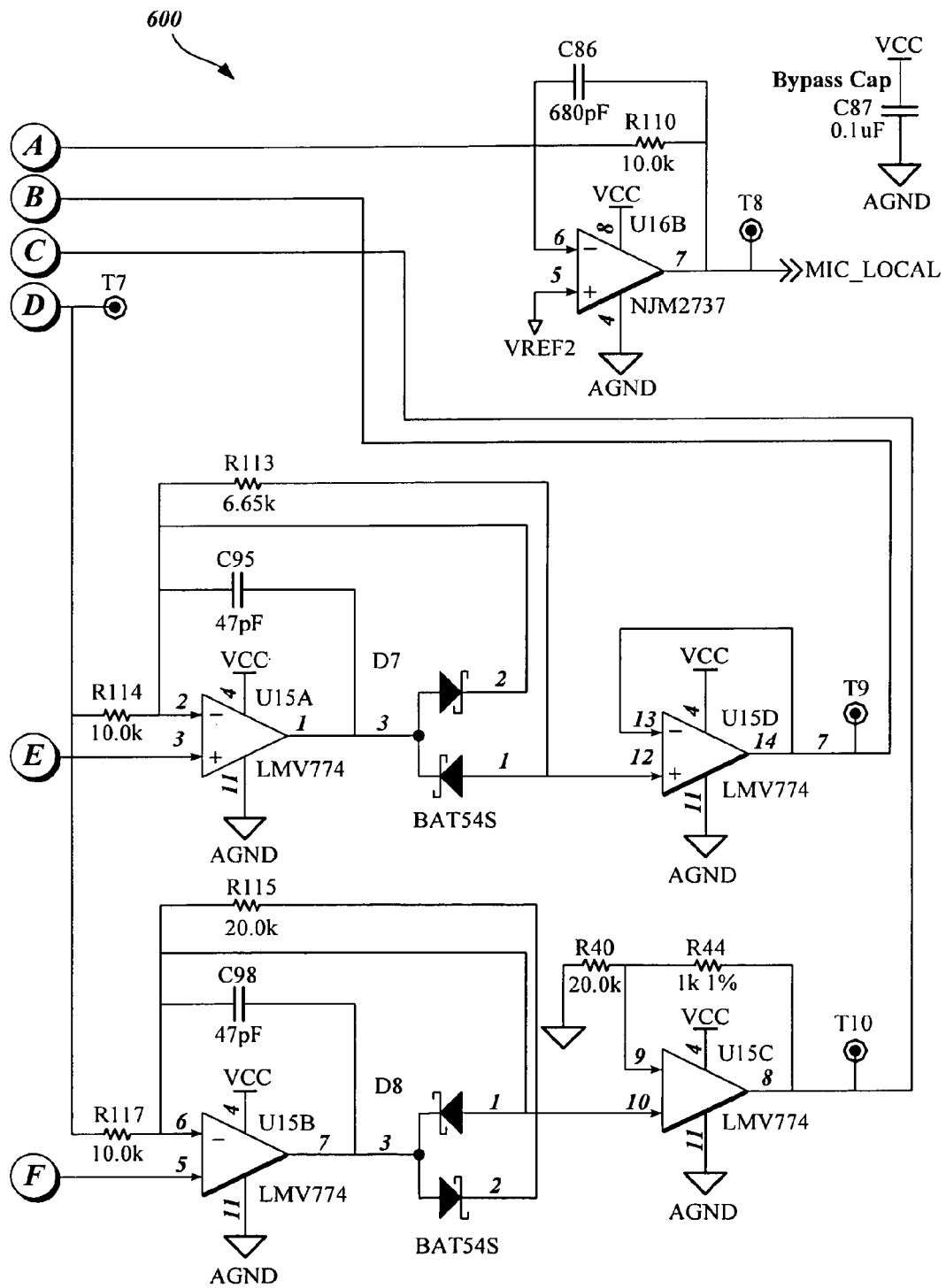

Returning to FIG. 4, the second center reference voltage VREF2 is electrically coupled to the second port of the resistor R86. Digressing again to follow the processing of the signal MIC1_IN, FIG. 6 illustrates an automatic gain control circuit 600. The signal MIC1_IN is presented at a first plate of a capacitor C91, which suitably includes a value of about 0.22 microfarad. A second plate of the capacitor C91 is electrically coupled to a first port of a resistor R112, which suitably includes a value of about 10.0 kilo-ohms and is also electrically coupled to pin 3 or the positive input of an operational amplifier U16A. A second port of the resistor R112 is coupled to the second center reference voltage VREF2. Any suitable operational amplifier can be used, such as Industry Part No. NJM2737. Pin 4 of the operational amplifier U16A is coupled to analog ground, and pin 8 of the operational amplifier is coupled to the source voltage VCC. A second pin of the operational amplifier U16A is the negative input and is coupled to a first port of a resistor R107 to a first plate of capacitor C85 and is also electrically coupled to a first port of a resistor R108. The resistor R107 suitably includes a value of about 150 ohms, and a second port is coupled to a first plate of a capacitor C89. The capacitor C89 suitably includes a value of about 100 microfarads and a second plate is coupled to the second center reference voltage VREF2. The capacitor C85 suitably includes a value of about 470 picofarads, and a second plate is coupled to a second port of the resistor R108, as well as to a first pin, which is the output of the operational amplifier U16A. The resistor R108 suitably includes a value of about 2.7 kilo-ohms. Together, the resistor R108, the capacitor C85, the resistor R107, the capacitor C89, and the electrical coupling to pin 2 of the operational amplifier U16A define a negative feedback loop that facilitates a gain of about 25 decibels.

Pin 1 of the operational amplifier U16A is coupled to a first plate of a capacitor C88 as well as to a first plate of a capacitor C90. Preferably, an upper range of voltage amplitude presented at pin 1 of the operational amplifier U16A is about 1.5 volts (rms) in one embodiment. The upper range can be suitably changed depending on a desired root-mean-square detection threshold to be executed by a compression circuit U14. A nominal voltage amplitude includes 14 decibels below the upper range. In one embodiment, a compression threshold may be set at 0.2 volt (rms) and in that embodiment, an expansion threshold may be set about 15 decibels lower, such as at 53 millivolts (rms). The capacitor C88 suitably includes a value of about 0.47 microfarad, and a second plate is coupled to a first port of a resistor R109. The resistor R109 suitably includes a value of about 10.0 kilo-ohms, and a second port is coupled to pin 15 of the compression circuit U14. Suitably, any compression circuit may be used, such as Industry Part No. THAT4315S. The compression circuit U14 provides dynamic range expansion below a set threshold to minimize ambient noise amplification and provides dynamic range compression above the set threshold to keep voice signals at relatively constant volume to avoid clipping or overloading of circuitry stages. The capacitor C90 suitably includes a value of about 0.47 microfarad, and a second plate is coupled to a first port of a resistor R111, which suitably includes a value of about 62 kilo-ohms. A second port of the resistor R111 is coupled to pin 2 of the compression circuit U14. In one embodiment, if a voltage amplitude being presented to pin 2 is about 0.3 volt (rms), preferably the resistor R111 limits the current to about 7.5 microamperes (rms). Pin 15 is an input into a voltage control amplifier portion of the compression circuit U14. Pin 2 is an input into the root-mean-square detection portion of the compression circuit U14. Pin 6 of the compression circuit U14, which is to receive a reference voltage, is electrically coupled to the second center reference voltage VREF2. Pin 9, which is to receive a voltage source, is coupled to the voltage source VCC. Pin 9 of the compression circuit U14 is also coupled to a first plate of a capacitor C93 and a first plate of a capacitor C96. These two capacitors C93, C96 in concert act as bypass capacitors. Pin 8 of the compression circuit U14 is electrically coupled to analog ground. The capacitor C93 suitably includes a value of about 68 microfarads, and a second plate is coupled to a first plate of a capacitor C92 as well as to analog ground. The capacitor C96 suitably includes a value of about 0.47 microfarad and a second plate is coupled to the first plate of the capacitor C92 as well as to analog ground. The capacitor C92 suitably includes a value of about 10 microfarads, and a second plate is coupled to pin 4 of the compression circuit U14. The capacitor C92 defines in part a root-mean-square time constant, which in one embodiment is about 75 microseconds. Pin 5 of the compression circuit U14 is the root-mean-square threshold output, which is electrically coupled to a first port of a resistor R114 and a first port of a resistor R117. The resistor R114 suitably includes a value of about 10.0 kilo-ohms, and a second port is coupled to a second pin, which is the negative input into an operational amplifier U15A. The second port of the resistor R114 is also coupled to a first plate of a capacitor C95, a second pin into a diode-pair D7, and a first port of a resistor R113. Pin 11 of the operational amplifier U15A is coupled to analog ground, and pin 4 is coupled to a source voltage VCC. The capacitor C95 suitably includes a value of about 47 picofarads, and a second plate is coupled to pin 1 of the operational amplifier U15A, which is the output of the operational amplifier and is also electrically coupled to pin 3 of the diode-pair D7. The resistor R113 suitably includes a value of about 6.65 kilo-ohms, and a second port is coupled to pin 1 of the diode-pair D7. The resistor R113 sets a desired compression threshold ratio. In one embodiment, an infinite ratio is chosen, but in another embodiment, a ratio of 2:1 is selected, and in a third embodiment, a 3:1 ratio is picked. The operation amplifier U15A and circuit elements proximal to it form a stage that causes a voltage (EC+) at pin 11 of the compression circuit U14 to decrease as the root-mean-square detector portion of the compression circuit U14 goes above a compression threshold, thereby causing gain reduction. The voltage EC+ remains at the center reference voltage VREF when the root-mean-square detector is below the compression threshold, thereby having no affect on gain.

Any suitable diode-pair can be used, such as Industry Part No. BAT54S. The diode-pair D7 includes the following configuration. Each of the two diodes is preferably formed from Schottky diodes. The anode of one diode is coupled to the cathode of the other diode and is electrically coupled to pin 3 of the diode-pair D7. Pin 2 is coupled to the cathode of one of the diodes, and pin 1 is the anode of the other of the diode-pair D7. In one embodiment, the diode-pair D7 functions like a Schmitt Trigger. Pin 1 of the diode-pair D7 is coupled to pin 12 of an operational amplifier U15D, which is the positive input into that operational amplifier. Pin 13, which is the negative input, is coupled to pin 14, which is the output of the operational amplifier U15D, hence, forming a unity gain operational amplifier. Pin 4 is coupled to a source voltage VCC, and pin 11 is coupled to analog ground. Any suitable operational amplifier can be used, such as Industry Part No. LMV774. Pin 14, the output of the operational amplifier U15D, is coupled to pin 11 of the compression circuit U14 for defining a positive voltage delimitation, which works in combination with a negative voltage delimitation at pin 12 of the compression circuit U14 to define an automatic gain affecting the output at pin 13 of the compression circuit U14. Either pin 11 or pin 12 of the compression circuit U14 may suitably include an input impedance of about 50 kilo-ohms in one embodiment.

Pin 3 of the operational amplifier U15A, which is the positive input, is electrically coupled to the second center reference voltage VREF2 and is also coupled to a first port of a resistor R116. The resistor R116 suitably includes a value of about 510 ohms and a second port is coupled to a first port of a resistor R118 and is also electrically coupled to pin 5, which is the positive input of an operational amplifier U15B. The operation amplifier U15B and circuit elements proximal to it form a stage that causes a voltage (EC−) at pin 12 of the compression circuit U14 to increase as the root-mean-square detector portion of the compression circuit U14 goes below an expansion threshold, thereby causing gain reduction. The voltage EC− remains at the center reference voltage VREF when the root-mean-square detector is above the expansion threshold, thereby having no affect on gain. The resistor R118 suitably includes a value of about 10.0 kilo-ohms and a second port is coupled to analog ground. The operational amplifier U15B can be selected from any suitable operational amplifiers, such as Industry Part No. LMV774. Pin 11 of the operational amplifier U15B is coupled to analog ground, and pin 4 is coupled to the source voltage VCC. The resistor R117 suitably includes a value of about 10.0 kilo-ohms and a second port is coupled to pin 6, which is the negative input into the operational amplifier U15B. Pin 6 of the operational amplifier U15B is also coupled to a first plate of a capacitor C98, pin 1 of a diode-pair D8, and a first port of a resistor R115. The resistor R115 sets a desired expansion threshold ratio, such as a 1:2 ratio. The capacitor C98 suitably includes a value of about 47 picofarads, and a second plate is coupled to pin 7 or the output of the operational amplifier U15B, as well as pin 3 of the diode-pair D8. The resistor R115 suitably includes a value of about 20.0 kilo-ohms, and a second port is coupled both to pin 10, which is the positive input of an operational amplifier U15C, as well as electrically coupled to pin 2 of the diode-pair D8. The diode-pair D8 can be suitably chosen from any diode-pair circuit, such as Industry Part No. BAT54S. Preferably, each diode of the diode-pair D8 is formed from Schottky diodes. Pin 1 of the diode-pair D8 preferably is the anode of one of the diodes and pin 2 is the cathode of the other of the diodes. Pin 3 is an electric coupling between the cathode of one of the diodes and the anode of the other of the diodes. In one embodiment, the diode-pair D8 functions like a Schmitt Trigger.

Pin 11 of the operational amplifier U15C is coupled to analog ground, and pin 4 is coupled to the source voltage VCC. The operational amplifier U15C can be chosen from any suitable operational amplifiers, such as Industry Part No. LMV774. Pin 9 is the negative input of the operational amplifier U15C and is coupled to a first port of a resistor R40 as well as to the first port of a resistor R44. The resistor R40 suitably includes a value of about 20.0 kilo-ohms, and a second port is coupled to analog ground. The resistor R44 suitably includes a value of about 1 kilo-ohm, and a second port is coupled to pin 8, which is the output of the operational amplifier U15C, and is also electrically coupled to pin 12 of the compression circuit U14, which receives the negative voltage delimitation together with the voltage presented at pin 11 of the compression circuit U14 for defining an automatic gain. Pin 13 of the compression circuit U14 is coupled to pin 6, which is the negative input of an operational amplifier U16B, and is electrically coupled to a first port of a resistor R110, and is also electrically coupled to a first plate of a capacitor C86. Pin 4 of the operational amplifier U16B is coupled to analog ground. Pin 5, which is the positive input, is coupled to the second center reference voltage VREF2. Pin 8 is coupled to the source voltage VCC. Any suitable operational amplifier can be used, such as Industry Part No. NJM2737. The resistor R10 suitably includes a value of about 10.0 kilo-ohms, and a second port is coupled to pin 7, which is the output of the operational amplifier U16B. The capacitor C86 suitably includes a value of about 680 picofarads, and a second plate is coupled to the second port of the resistor R110 as well as to the output or pin 7 of the operational amplifier U16B. The signal that is presented at pin 7 of the operational amplifier U16B has a nomenclature MIC_LOCAL. Together, the resistor R110, the capacitor C86, and the electrical coupling to pin 6 of the operational amplifier U16B define a gain of about 6 decibels at pin 7 of the operational amplifier.

Returning to FIG. 4, the signal MIC_LOCAL produced by the circuit 600 of FIG. 6 is introduced to a first port of a resistor R81 and a first port of a resistor R129. The resistor R81 acts as a sidetone setter, as previously discussed in connection with element 312 of FIG. 3A. Suitably, the resistor R81 includes a value of about 62 kilo-ohms and a second port is coupled to a first port of a resistor R80 and pin 6 of an operational amplifier U11B. The resistor R80 suitably includes a value of about 4.99 kilo-ohms, and a second port is coupled to pin 1 or the output of an operational amplifier U11A. Any suitable operational amplifier can be used, such as Industry Part No. LMV774. Pin 1 is coupled to a first port of a resistor R74. The resistor R74 suitably includes a value of about 4.99 kilo-ohms and a second port is coupled to pin 2 or the negative input of the operational amplifier U11A and is also electrically coupled to a first port of a resistor R73. The resistor R73 suitably includes a value of about 4.99 kilo-ohms, and a second port is coupled to a center reference voltage VREF. Together, the resistor R74, the resistor R73, and an electrical path to pin 2 of the operational amplifier U11A define a negative feedback loop that causes the operational amplifier U11A to have a gain of about 6 decibels. Pin 4 of the operational amplifier U11A is coupled to a source voltage VCC and pin 11 is coupled to analog ground. Pin 3, or the positive input of the operational amplifier U11A, is electrically coupled to a first port of a resistor R82. The resistor R82 suitably includes a value of about 10.0 kilo-ohms, and a second port is coupled to the center reference voltage VREF. Pin 3 of the operational amplifier U11A is also coupled to a first plate of a capacitor C70. The capacitor C70 suitably includes a value of about 1 microfarad, and a second plate is coupled to a first port of a resistor R94 and a first port of an inductor L5, which acts to squelch spurious noise. Any suitable inductor can be used, such as Industry Part No. GZ1608D471. The resistor R94 suitably includes a value of about 540 ohms, and a second port is coupled to analog ground. Preferably, the resistor R94 acts as an identifying bit to a piece of Xbox LIVE equipment when a query is made at a jack J10.

A second port of the inductor L5 is coupled to the jack J10, which is adapted to receive a signal XB_IN coming from the piece of Xbox LIVE equipment. The second port of the inductor L5 is also coupled to a first port of a diode-pair D17. A second part of the diode-pair D17 is coupled to analog ground. Any suitable diode-pair can be used, including Industry Part No. PESD5V0S1. The jack J10 is a female fitting coupled to an electric circuit used with a plug to make a connection with another circuit, such as circuitry connected with the piece of Xbox LIVE equipment. Jack J10 is a 3-pin jack that can be mated with plugs, preferably in a form of a 2.5 mm phone jack, having Industry Part No. PJ-211A. One pin of the jack J10 is coupled to analog ground. Another pin of the jack J10 is coupled to the second port of the inductor L5 to clarify and remove spurious noise prior to entering the circuit 400. The remaining pin of the jack J10 is for outputting a signal XB_OUT that is produced by the circuit 400, as will be discussed below.

Pin 6 of the operational amplifier U11B is also electrically coupled to a first port of a resistor R78 and a first port of a resistor R75. Both the resistors R75, R78 suitably have values of about 4.99 kilo-ohms. A second port of the resistor R78 receives a signal DSCR, and a second port of the resistor R75 receives another signal DSCL. The signal DSCR contains audio information coming from the right channel of the daisy chain network. The signal DSCL contains audio information coming from the left channel of the daisy chain network.

Figure 8:
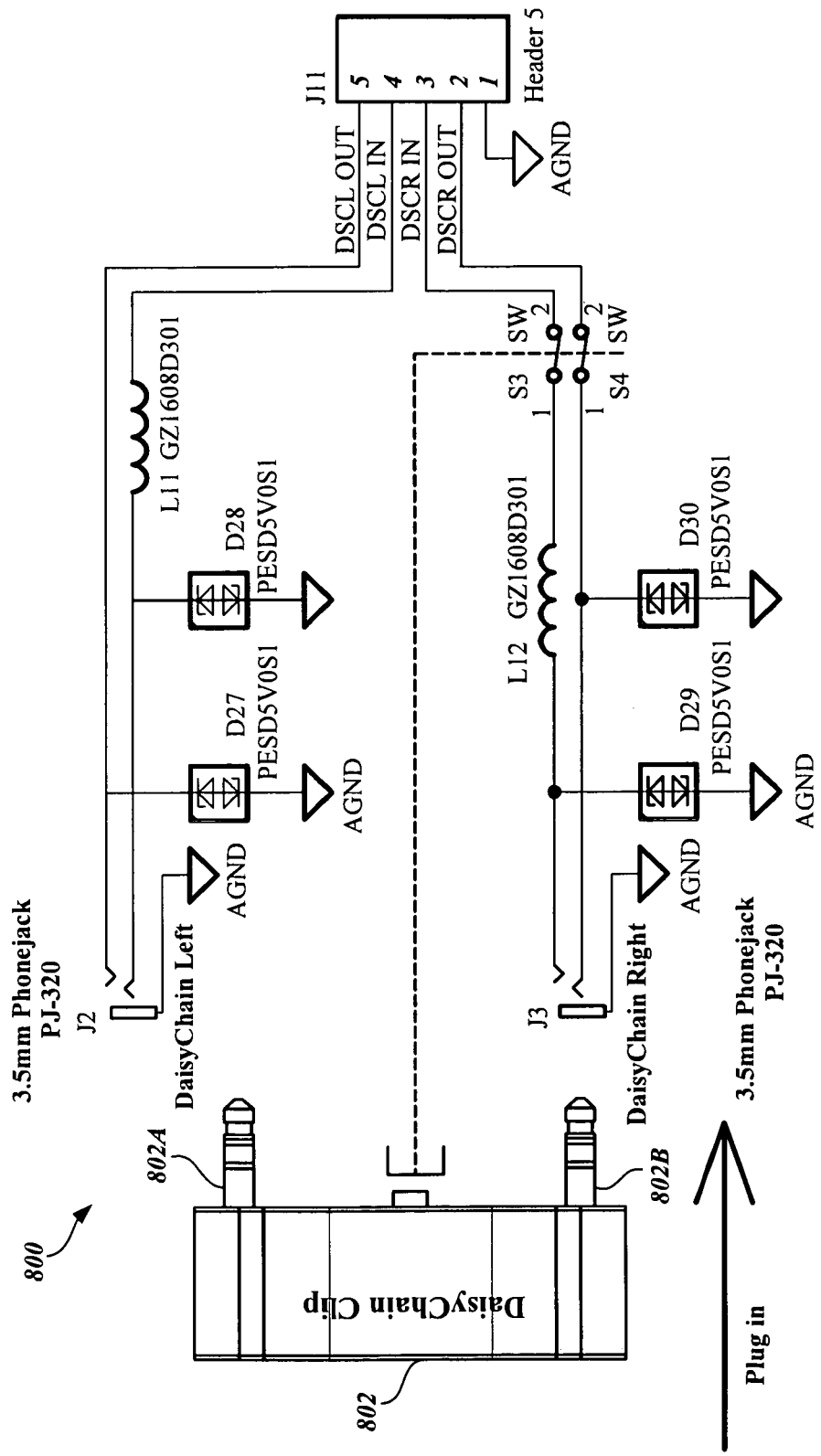
FIG. 8 is a circuit diagram illustrating exemplary daisy-chain interfacing circuitry.

Digressing to circuitry that generates the signals DSCL and DSCR, FIG. 8 illustrates a circuit 800 for receiving audio information coming from the left of the daisy chain and the right of the daisy chain. FIG. 8 includes a daisy chain clip 802 having two plugs 802a, 802b, that mate with jacks J2, J3 to inhibit a game audio exchange from being daisy-chainable. When a game audio exchange is to be daisy-chained with other game audio exchanges, the daisy chain clip 802 is removed, allowing exposure of jacks J2, J3. Jacks J2, J3 are female fittings coupled to an electric circuit used with a plug to make a circuit with another circuit; both jacks J2, J3 are preferably a 3.5 mm phone jack. Any suitable 3.5 mm phone jack can be used, such as Industry Part No. PJ-320. Both jacks J2, J3 are 3-pin jacks that can be mated with plugs to facilitate transmission of audio information on the daisy chain network. Jack J2 receives and transmits leftward audio information on the daisy chain. One of the pins of jack J2 is electrically coupled to analog ground. Another pin of the jack J2 receives leftward audio information on the daisy chain network and introduces the audio information to a first port of a diode-pair D28 and a first port of an inductor L11. Any suitable diode-pair can be used, including Industry Part No. PESD5VOS1.

A second port of the diode-pair D28 is coupled to analog ground. Any suitable inductor can be used for the inductor L11, including Industry Part No. GZ1608D301. A second port of the inductor L11 introduces a signal DSCL-IN to pin 4 of a 5-pin jack J1. Jack J1 is a female fitting coupled to an electric circuit used with a plug to make a connection with another circuit, such as those associated with the circuit 700 of FIG. 7. The signal DSCL_IN represents audio information coming from the leftward of the daisy chain network. Pin 5 of jack J1 introduces another signal DSCL_OUT, which represents audio information processed and generated by a daisy-chainable game audio exchange that is to be transmitted leftward on the daisy chain network. The signal DSCL_OUT, before being presented at the remaining pin of the jack J2, encounters a first port of a diode-pair D27, whose second port is coupled to analog ground. Any suitable diode-pair can be used, including Industry Part No. PESD5VOS1.

Jack J3 is a 3-pin jack. One of the pins is coupled to analog ground. Another of jack J3's pins receives audio information coming from the rightward of the daisy chain network. That pin of the jack J3 is electrically coupled to a first port of a diode-pair D29, whose second port is coupled to analog ground. Any suitable diode-pair can be used, including Industry Part No. PESD5VOS1. The first port of the diode-pair D29 is also coupled to a first port of an inductor L12, whose second port is electrically coupled to a first pin of a switch S3. Any suitable inductor can be used, including Industry Part No. GZ1608D301. Normally, the switch S3 is in the closed position for conducting current from pin 1 to pin 2 of the switch S3. When the daisy chain clip 802 is inserted into the jack J3, the switch S3 is left in an open state. Pin 2 of the switch S3 is coupled to pin 3 of the jack J1 and the signal that flows into pin 3 of the jack J1 has a nomenclature of DSCR_IN. The signal DSCR_IN represents audio information coming from the rightward of the daisy chain network. Pin 2 of the jack J1 introduces another signal DSCR_OUT, which contains audio information coming from the game audio exchange that should be transmitted rightward on the daisy chain network. The signal DSCR_OUT encounters a second pin of a switch S4, which normally is in the closed position. If the switch S4 is in the closed position, the signal DSCR_OUT flows to pin 1 of the switch S4 and continues on to the remaining pin of the jack J3 for transmission into the rightward daisy chain network. Electrically coupled to pin 1 of the switch S4 is a first port of a diode-pair D30, whose second port is coupled to analog ground. Any suitable diode-pair can be used, including Industry Part No. PESD5VOS1. If the daisy chain clip 802 is inserted into the jack J3, the switch S4 will be left in an open state. Pin 1 of the jack J1, which is the remaining pin, is preferably coupled to analog ground.

Figure 7:
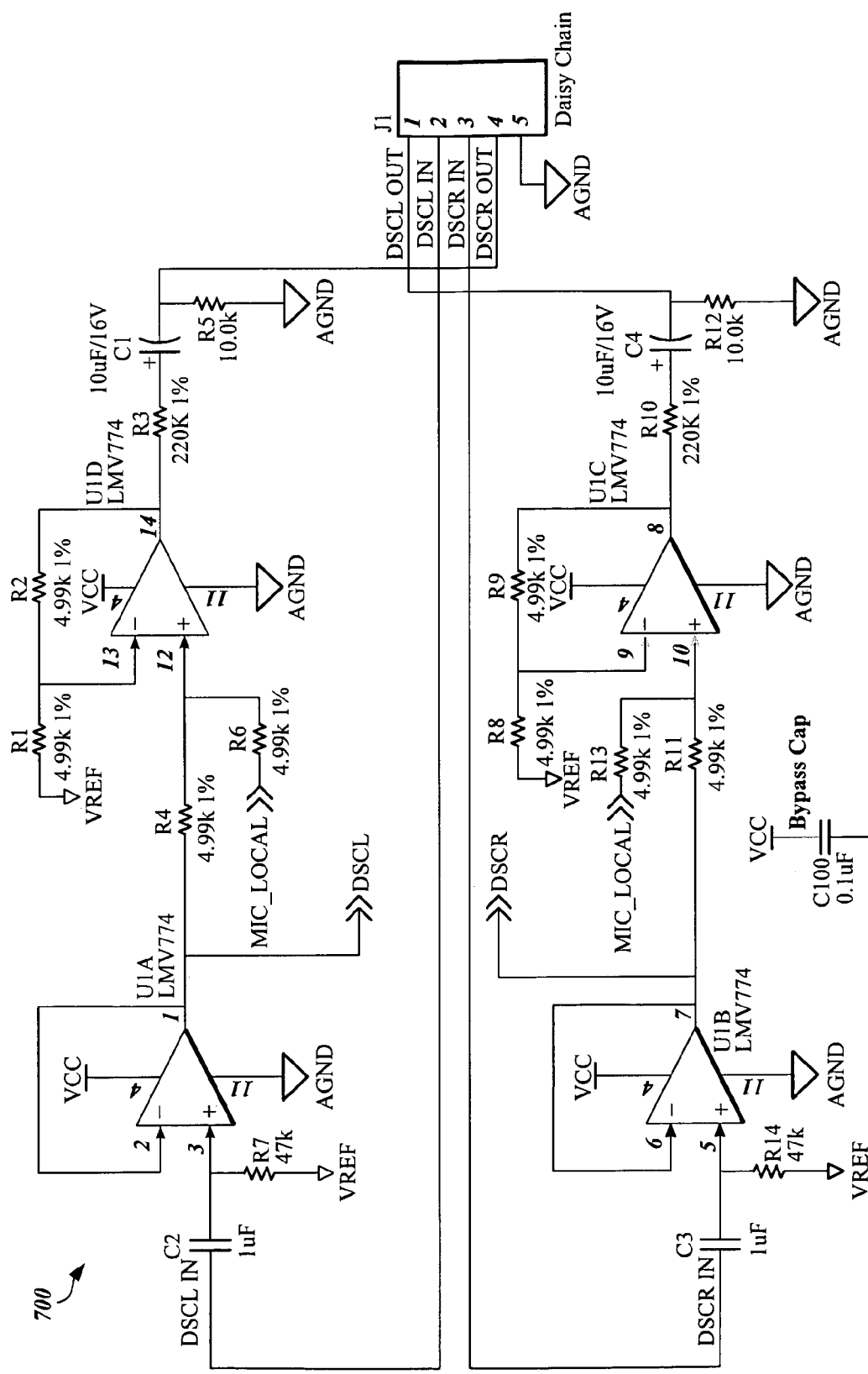
FIG. 7 is a circuit diagram illustrating exemplary daisy-chain mixing circuitry.

FIG. 7 illustrates a circuit 700 that processes audio information to produce signals DSCL_OUT; DSCL_IN; DSCR_IN; and DSCR_IN, as previously discussed in connection with the circuit 800 at FIG. 8. Pin 2 of the jack J1 receives signal DSCL_IN and presents the signal to a first plate of a capacitor C2. The capacitor C2 suitably includes a value of about 1 microfarad, and a second plate is coupled to a first port of a resistor R7 and pin 3, which is the positive input, of an operational amplifier U1A. The resistor R7 suitably includes a value of about 47 kilo-ohms, and a second port is coupled to the center reference voltage VREF. Any suitable operational amplifier could be used, including Industry Part No. LMV774.

Pin 4 of the operational amplifier U1A is coupled to the source voltage VCC, and pin 11 is coupled to analog ground. Pin 1, which is the output of the operational amplifier U1A, is coupled directly to pin 2, or the negative input of the operational amplifier U1A, thereby facilitating unity gain configuration. The output of the operational amplifier U1A at pin 1 produces the signal DSCL, which is presented to the circuit 400 at FIG. 4. Pin 1 of the operational amplifier U1A is also electrically coupled to a first port of a resistor R4. The resistor R4 suitably includes a value of about 4.99 kilo-ohms and a second port is coupled to pin 12, which is the positive input of an operational amplifier U1D. Pin 12 of the operational amplifier U1D is also coupled to a first port of a resistor R6. The resistor R6 suitably includes a value of about 4.99 kilo-ohms, and a second port is adapted to receive the signal MIC_LOCAL, which is produced by the circuit 600 of FIG. 6. Mathematically, the signal DSCL and the signal MIC_LOCAL are each a summand being presented at pin 12 of the operational amplifier U1D. Pin 4 of the operational amplifier U1D is coupled to the source voltage VCC and pin 11 is coupled to analog ground.

The output of the operational amplifier U1D is taken from pin 14, which is coupled to pin 1 of a resistor R2. The resistor R2 suitably includes a value of about 4.99 kilo-ohms and a second port is coupled to both a first port of a resistor R1 and pin 13, which is the negative input of the operational amplifier U1D. The resistor R1 suitably includes a value of about 4.99 kilo-ohms, and a second port is coupled to the center reference voltage VREF. Together the resistor R1, the resistor R2, and the network connection to pin 13 of the operational amplifier U1D create a negative feedback network to produce a gain of about 6 decibels at pin 14. Pin 14 is electrically coupled to a first port of a resistor R3. The resistor R3's second port is coupled to a first plate of a capacitor C1. The capacitor C1 suitably includes a value of about 10 microfarads, and a second plate is coupled to both a first port of a resistor R5 and pin 4 of the jack J1. Together, the resistor R1, the capacitor C, and the electrical coupling into pin 2 of the operational amplifier U1A define a negative feedback loop facilitating a gain that compensate for any compression of the current coming from the compression circuit U2. The resistor R5 suitably includes a value of about 10.0 kilo-ohms, and a second port is coupled to analog ground. Together, the capacitor C1 and the resistor R5 form a high pass filter eliminating low frequency noise prior to the entry of the signal DSCR_OUT into the jack J1.

Pin 3 of the jack J1 receives the signal DSCR_IN and presents such a signal to a first plate of a capacitor C3. The capacitor C3 suitably includes a value of about 1 microfarad, and a second plate is coupled both to pin 5, which is the positive input of an operational amplifier U1B, as well as electrically coupled to a first port of a resistor R14. The resistor R14 suitably includes a value of about 47 kilo-ohms, and a second port is coupled to the center reference voltage VREF. Any suitable operational amplifier can be used, including Industry Part No. LMV774.

Pin 4 of the operational amplifier is coupled to the source voltage VCC, and pin 11 is coupled to analog ground. The output of the operational amplifier U1B is presented at pin 7, which is electrically coupled to pin 6, which is the negative input of the operational amplifier, thereby forming unity gain configuration. The signal taken from pin 7 or the output of the operational amplifier U1B is the signal DSCR, which is presented to the circuit 400 of FIG. 4. The signal DSCR is also introduced into a first port of a resistor R11. The first port of the resistor R11 suitably includes a value of about 4.99 kilo-ohms, and a second port is coupled to both a first port of a resistor R13 and pin 10, which is the positive input of an operational amplifier U1C. The resistor R13 suitably includes a value of about 4.99 kilo-ohms and a second port is adapted to receive the signal MIC_LOCAL (which is coming from the circuit 600 of FIG. 6). In essence, the signal MIC_LOCAL and the signal DSCR are each a summand signal being presented at pin 10 or the positive input of the operational amplifier U1B for summation. Pin 4 of the operational amplifier is electrically coupled to the source voltage VCC and pin 11 is coupled to analog ground. Pin 8 or the output of the operational amplifier is coupled to a first port of a resistor R9. The resistor R9 suitably includes a value of about 4.99 kilo-ohms and a second port is coupled to both a first port of a resistor R8 and pin 9 or the negative input of the operational amplifier U1C. The resistor R8 suitably includes a value of about 4.99 kilo-ohms and a second port is electrically coupled to the center reference voltage VREF. Together the resistors R8, R9 and the network connecting to pin 9 of the operational amplifier U1C form a negative feedback loop facilitating a gain of about 6 decibels. Pin 8 is also coupled to a first port of a resistor R10, and a second port of the resistor R10 is electrically coupled to a first plate of a capacitor C4. The capacitor C4 suitably includes a value of about 10 microfarads and a second port is coupled to the first port of a resistor R12. The resistor R12 suitably includes a value of about 10.0 kilo-ohms, and a second port is coupled to analog ground. The signal taken from the second plate of the capacitor C4 is the signal DSCL_OUT, which is presented at pin 1 of the jack J1.

Returning to the circuit 400 at FIG. 4, pin 6 of the operational amplifier U11B receives a number of signals that have been processed by various circuits of a daisy-chainable game audio exchange. The signals that incident pin 6 of the operational amplifier U11B are each a summand signal that will be audibly combined by the operational amplifier U11B. Thus, the signal DSCL that is processed by the resistor R75, the signal DSCR that is processed by the resistor R78, the signal XB_N that has been processed by a number of circuit components (including the resistor R80), and the signal MIC_LOCAL that has been processed by the resistor R81, are each a summoned signal that is presented at pin 6, which is the negative input of the operational amplifier U11B. Any suitable operational amplifier can be used, such as Industry Part No. LMV774. Pin 4 of the operational amplifier is electrically coupled to the source voltage VCC, and pin 11 is coupled to analog ground. Pin 5, which is the positive input of the operational amplifier U11B, is electrically coupled to the center reference voltage VREF. Pin 7 is the output of the operational amplifier U11B, and it is electrically coupled to a first port of a resistor R76. The resistor R76 suitably includes a value of about 4.99 kilo-ohms, and a second port is coupled to pin 6, or the negative input of the operational amplifier U11B, thereby forming a negative feedback network facilitating a gain of about 6 decibels.

Pin 7 of the operational amplifier U11B is electrically coupled to the first ports of a knob RP1A, RP1B. Suitably the knob RP1A, RP1B is a resistive potentiometer of about 10 kilo-ohms. The knob RP1A, RP1B is used to receive an indication of balance between voice information and game information from a user using the daisy-chainable game audio exchange. To set an equal percentage of balance between voice information and game information, the knob RP1A, RP1B should be set at the 12 o'clock position. Settings away from this position will increase contribution percentage from either voice information or game information. A second port of knob RP1A is electrically coupled to pin 12 or the positive input of an operational amplifier U12D, and a second port of the knob RP1B is electrically coupled to pin 10, which is the positive input of an operational amplifier U12C. Any suitable operational amplifier can be used for operational amplifiers U12D, U12C, including Industry Part No. LMV774.

A third port of the knob RP1A is coupled to pin 1 of an operational amplifier U12A, which acts as an output. Any suitable operational amplifier can be used for the operational amplifier U12A, including Industry Part No. LMV774. Pin 4 of the operational amplifier is electrically coupled to the source voltage VCC, and pin 11 is coupled to analog ground. Pin 1 of the operational amplifier U12A is electrically coupled to a first port of a resistor R88. The resistor R88 preferably includes a value of about 10.0 kilo-ohms, and a second port is coupled to both a second pin, which is the negative input of the operational amplifier U12A and is also electrically coupled to a first port of a resistor R87. The resistor R87 suitably includes a value of about 4.99 kilo-ohms, and a second port is coupled to the center reference voltage VREF. A negative feedback loop is formed by the resistors R87, R88 and the network into pin 2 or the negative input of the operational amplifier U12A, thereby forming a gain of about 12 decibels.

Pin 3 of the operational amplifier U12A is also the positive input, and it is electrically coupled to a first port of a resistor R92 and a first plate of a capacitor C74. The resistor R92 suitably includes a value of about 47 kilo-ohms, and a second port is electrically coupled to the center reference voltage VREF. The capacitor C74 suitably includes a value of about 3.3 microfarads, and a second plate is adapted to receive a signal R_TV_TIP, which is rightward audio information coming from a game console via a television.

A third port of the knob RP1B is electrically coupled to pin 7 or the output of an operational amplifier U12B and is also electrically coupled to a first port of a resistor R97. Any suitable operational amplifier can be used, including Industry Part No. LMV774. The resistor R97 suitably includes a value of about 10.0 kilo-ohms, and a second port is electrically coupled to pin 6 for the negative input of the operational amplifier U12B and is also electrically coupled to a first port of a resistor R96. The resistor R96 suitably includes a value of about 4.99 kilo-ohms, and a second port is electrically coupled to the center reference voltage VREF. Pin 4 of the operational amplifier is electrically coupled to the source voltage VCC, and pin 11 is electrically coupled to analog ground.

Together, the resistor R96, the resistor R97, and the network connecting pin 6 or the negative input of the operational amplifier U12B form a negative feedback loop to create a gain of approximately 12 decibels. Pin 5, or the positive input of the operational amplifier U12B, is electrically coupled to a first port of a resistor R102 as well as a first plate of a capacitor C83. The resistor R102 suitably includes a value of about 47 kilo-ohms, and a second port is electrically coupled to the center reference voltage VREF. The capacitor C83 suitably includes a value of about 3.3 microfarads, and a second plate is adapted to receive a signal L_TV_TIP, which represents leftward audio information coming from a game console via a television.

Figure 9A:
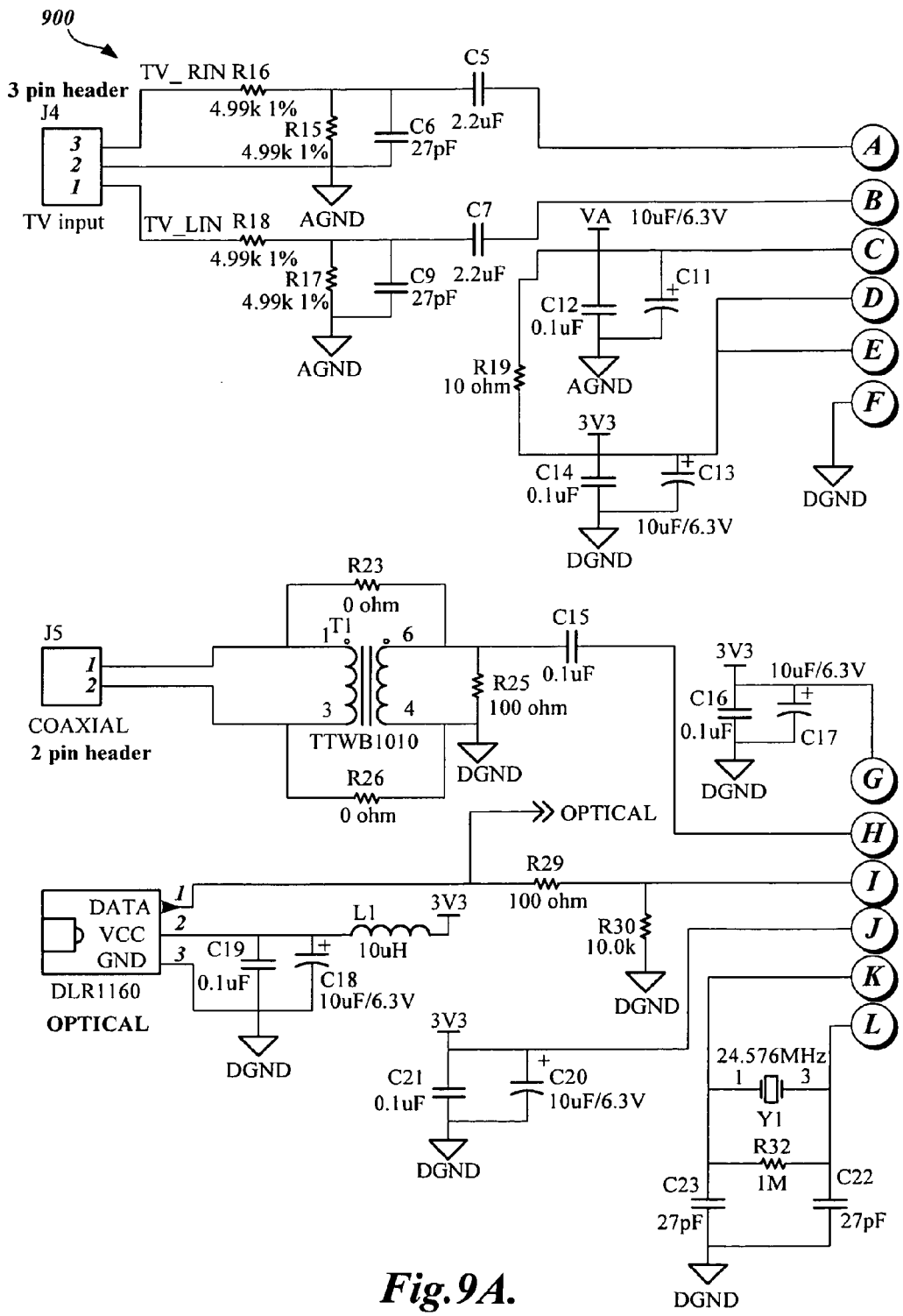
FIG. 9 is a circuit diagram illustrating exemplary digital audio processing circuitry.
Figure 9B:
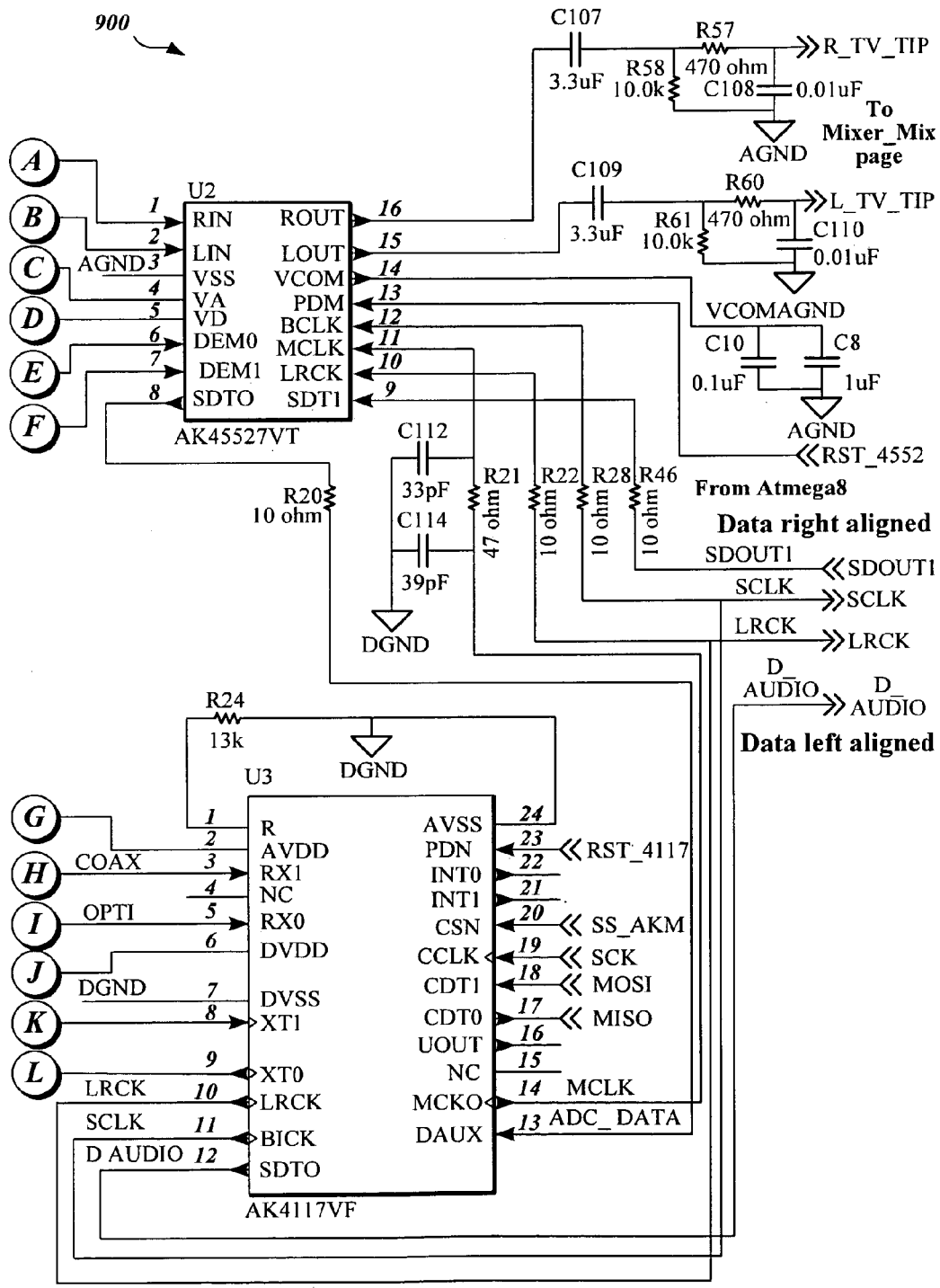

Digressing, the signals R_TV_TIP, L_TV_TIP, which are presented to the circuit 400 of FIG. 4, are generated from a circuit 900 of FIG. 9. The signal R_TV_TIP comes from a node to which a first plate of a capacitor C108 and a first port of a resistor R57 are electrically coupled. The capacitor C108 typically has a value of about 0.01 microfarad, and a second plate is coupled to analog ground. The resistor R57 includes a value of about 470 ohms and a second port is coupled to a first plate of a capacitor C107 and a first port of a resistor R58. The resistor R58 suitably includes a value of about 10.0 kilo-ohms, and a second port is coupled to analog ground. The capacitor C107 suitably includes a value of about 3.3 microfarads, and a second port is coupled to pin 16 of an audio CODEC circuit U2, which presents rightward audio information that is processed to form the signal R_TV_TIP.

The signal L_TV_TIP is taken from a node to which a first plate of a capacitor C110 and a first port of a resistor R60 are electrically coupled. The capacitor C110 suitably includes a value of about 0.01 microfarad, and a second port is electrically coupled to analog ground. The resistor R60 suitably includes a value of about 470 ohms, and a second port is electrically coupled to a first plate of a capacitor C109 and a first port of a resistor R61. The resistor R61 suitably includes a value of about 10.0 kilo-ohms, and a second port is electrically coupled to analog ground. The capacitor C109 suitably includes a value of about 3.3 microfarads, and a second port is coupled to pin 15 of the audio CODEC circuit U2, which presents leftward audio information.

Figure 10:
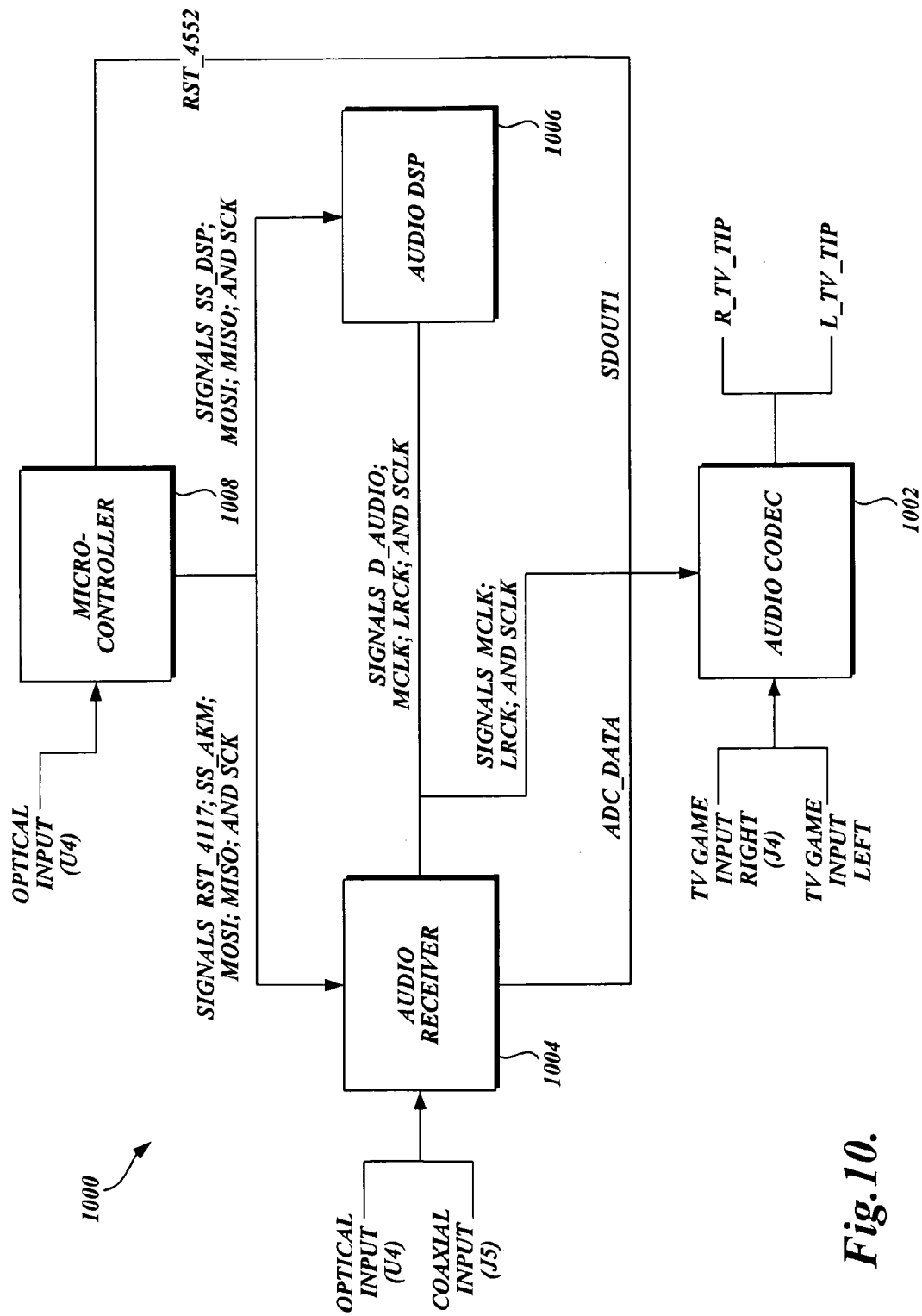
FIG. 10 is a block diagram illustrating pieces of hardware connected with digital audio processing.

Further digressing, to better understand a context in which the audio CODEC U2 participates in combination with other audio processing circuitry, FIG. 10 illustrates a system 1000. The system 1000 includes an audio CODEC 1002, which is a piece of hardware that can convert audio signals between analog and digital forms using both a compressor circuit and a decompressor circuit. Any suitable audio CODEC can be used, including Industry Part No. AK4552VT. From the jack J4, audio information from a television both leftward and rightward that originates from a game console are presented to the audio CODEC 1002. The audio CODEC 1002 produces two signals: a rightward TV game output signal, which has the nomenclature of R_TV_TIP, and a leftward TV game output signal, which has the nomenclature L_TV_TIP.

The audio CODEC 1002 presents a digital signal called ADC_DATA, which represents digital audio information that has been converted from analog information to the audio receiver 1004. Any suitable audio receiver can be used, including Industry Part No. AK4117VF. The audio receiver 1004 is adapted to receive audio information coming directly from the game console, such as an optical input coming from circuit U4 and coaxial input coming from jack J5. Preferably, audio information coming from the optical input has the highest priority, audio information coming from the coaxial input has medium priority and audio information coming from jack J4, which includes TV game information, has the lowest priority. The optical input coming from the circuit U4 is also provided to a microcontroller 1008 so as to enable the microcontroller 1008 to give priority to the optical input. Any suitable microcontroller can be used, including Industry Part No. ATMEGA8L-8AU1, which is an 8-bit microprocessor.

The microcontroller produces three reset signals to control various components of the system 1000, such as a signal RST_4117 to control the audio receiver 1004 and signal RST_4552 to control the audio CODEC 1002. A serial bus is provided by the microcontroller 1008 to cause information to be transferred between the microcontroller 1008 and the audio receiver 1004, as well as an audio DSP processor 1006. Signals that comprise the serial bus between the microcontroller 1008 and the audio receiver 1004 include SS_AKM, MOSI, MISO, and SCK. Similarly, signals that comprise the serial bus between the microcontroller 1008 and the audio DSP processor 1006 include SS_DSP, MOSI, MISO, and SCK.

The audio receiver 1004 provides digital audio information in the form of a signal D_AUDIO, which contains data taken from the optical input at the circuit U4 or the coaxial input at jack J5, and presents the signal D_AUDIO to the audio DSP processor 1006. Three clocks are provided by the audio receiver 1004 to the audio DSP processor 1006 for interpretation of the data contained in the signal D_AUDIO. The audio receiver 1004 also provides the signals MCLK, LRCK, and SCLK to the audio CODEC 1002 so as to allow the audio CODEC 1002 to use these clock signals to interpret another signal SDOUT1 coming from the audio DSP processor 1006. The signal SDOUT1 contains digital audio information that has been processed by the audio DSP processor 1006 and which shall be converted into analog signals R_TV_TIP and L_TV_TIP, which are presented to the circuit 400 of FIG. 4. Any suitable audio DSP processor can be used, including Industry Part No. DSPD56374.

Returning to the circuit 900 of FIG. 9, the audio CODEC U2 produces the signals that form the signals R_TV_TIP and L_TV_TIP, which are TV game output analog signals with Dolby surround sound information. Preferably, the maximum output of these signals R_TV_TIP and L_TV_TIP is approximately 1.75 volts peak-to-peak and a minimum low resistance of about 10 kilo-ohms. Pin 14 of the audio CODEC U2 is electrically coupled to a first plate of a capacitor C10 and a first plate of a capacitor C8. The capacitor C10 suitably includes a value of about 0.1 microfarad, and a second plate is electrically coupled to analog ground. The capacitor C8 suitably includes a value of about 1 microfarad, and a second plate is also coupled to analog ground. Pin 123 of the audio CODEC U2 receives the signal RST_4552 coming from the microcontroller 1008 so as to allow the audio CODEC U2 to be reset by the microcontroller 1008. Pin 12 of the audio CODEC U2 is electrically coupled to a first port of a resistor R22. The resistor R22 suitably includes a value of about 10 ohms, and a second port is adapted to receive the signal SCLK from the audio receiver 1004. Pin 11 is electrically coupled to a first plate of a capacitor C112 and a first port of a resistor R21. The capacitor C112 suitably includes a value of about 33 picofarads, and a second plate is coupled to digital ground as well as to a first plate of a capacitor C114. The capacitor C114 suitably includes a value of about 39 picofarads, and a second plate is coupled to a second port of the resistor R21. The resistor R21 suitably includes a value of about 47 ohms, and a second port is adapted to receive the signal MCLK coming from the audio receiver U3. Pin 10 of the audio CODEC U2 is electrically coupled to a first port of a resistor R22. The resistor R22 suitably includes a value of about 10 ohms and a second port is adapted to receive the signal LRCK coming from the audio receiver U3. Pin 9 of the audio CODEC U2 is electrically coupled to a first port of a resistor R46. The resistor R46 suitably includes a value of about 10 ohms, and a second port is adapted to receive the signal SDOUT1 coming from the audio DSP processor 1006.

Pin 8 of the audio CODEC U2 is electrically coupled to a first port of a resistor R20. The resistor R20 suitably includes a value of about 10 ohms, and a second port is adapted to introduce the signal ADC_DATA to the audio receiver U3. Pin 7 is electrically coupled to digital ground. Pins 5 and 6 are electrically coupled to a first plate of a capacitor C13, a first plate of a capacitor C14, and to a voltage source 3V3. The capacitor C13 suitably includes a value of about 10 microfarads, and a second plate is coupled to digital ground. The capacitor C14 suitably includes a value of about 0.1 microfarad, and a second port is also coupled to digital ground. The voltage source 3V3 is electrically coupled to a first port of a resistor R19. The resistor R19 suitably includes a value of about 10 ohms, and a second port is coupled to a voltage source VA, a first plate of a capacitor C12, a first plate of a capacitor C11, and pin 4 of the audio CODEC U2. The capacitor C12 suitably includes a value of about 0.1 microfarad, and a second plate is coupled to analog ground. The capacitor C11 suitably includes a value of about 10 microfarads, and a second plate is also coupled to analog ground. Pin 3 of the audio CODEC U2 is electrically coupled to analog ground. Pin 2 of the audio CODEC U2 is adapted to receive leftward audio information and is electrically coupled to a first plate of a capacitor C7. The capacitor C7 suitably includes a value of about 2.2 microfarads, and a second plate is coupled to a first plate of a capacitor C9, a first port of a resistor R17, and another first port of a resistor R18. The capacitor C9 suitably includes a value of about 27 picofarads, and a second plate is coupled to analog ground. The resistor R17 suitably includes a value of about 4.99 kilo-ohms, and a second port is also coupled to analog ground. The resistor R18 suitably includes a value of about 4.99 kilo-ohms, and a second port is adapted to receive leftward signals coming from pin 1 of a jack J4, which is a female fitting coupled to an electric circuit used with a plug to make a connection with the circuit 900 to receive leftward input information from a television. Pin 2 of the jack J4 is coupled to analog ground. Pin 3 of jack J4 is adapted to receive rightward information coming from the television and is electrically coupled to a first port of a resistor R16. The resistor R16 suitably includes a value of about 4.99 kilo-ohms, and a second port is coupled to a first port of a resistor R15, the first plate of a capacitor C6, and a first plate of a capacitor C5. The resistor R15 suitably includes a value of about 4.99 kilo-ohms, and a second port is coupled to analog ground. The capacitor C6 suitably includes a value of about 27 picofarads, and a second plate is coupled to analog ground. The capacitor C5 suitably includes a value of about 2.2 microfarads, and a second plate is coupled to pin one of the video CODEC U2.

Pin 24 of the audio receiver U3 is electrically coupled to digital ground. Pin 23 is adapted to receive the reset signal RST_4117 coming from the microcontroller 1008. Pins 20, 19, 18, 17 are adapted to receive, from the microcontroller 1008, signals SS_AKM, SCK, MOSI, and MISO, respectively. Pin 14 of the audio receiver U3 produces the signal MCLK. Pin 13 of the audio receiver U3 is adapted to receive the signal ADC_DATA coming from the audio CODEC U2.

Pin 12 of the audio receiver U3 presents the signal D_AUDIO to the audio DSP processor 1006. Pin 11 of the audio receiver U3 produces the signal SCLK, which is presented to both the audio DSP processor 1006 as well as to the audio CODEC U2. Pin 10 of the audio receiver U3 produces the signal LRCK, which is presented to both the audio DSP processor 1006 as well as the audio CODEC U2. Pin 9 of the audio receiver U3 is electrically coupled to a first port of a crystal Y1, a first port of a resistor R32, and a first plate of a capacitor C22. The crystal Y1 suitably includes a value of about 24.576 MEGAHERTZ, and a second port is coupled to pin 8 of the audio receiver U3, as well as to a second port of the resistor R32 and to a first plate of a capacitor C23. The capacitor C22 suitably includes a value of about 27 picofarads, and a second plate is coupled to digital ground. Also coupled to digital ground is a second plate of a capacitor C23, which suitably includes a value of about 27 picofarads. Pin 7 of the audio receiver U3 is coupled to digital ground. Pin 6 of the audio receiver U3 is electrically coupled to the voltage source 3V3, a first plate of a capacitor C21, and a first plate of a capacitor C20. The capacitor C21 suitably includes a value of about 0.1 microfarad, and a second plate is coupled to digital ground. The capacitor C20 suitably includes a value of about 10 microfarads, and a second plate is coupled to digital ground. Pin 5 of the audio receiver U3 is adapted to receive optical audio information, and it is electrically coupled to a first port of a resistor R30 as well as to a first port of a resistor R29. The resistor R30 suitably includes a value of about 10.0 kilo-ohms, and a second port is coupled to digital ground. The resistor R29 suitably includes a value of about 100 ohms, and a second port is coupled to pin 1 of an optical circuit U4. Also taken from either pin 1 or the second port of the resistor R29 is an optical signal that is directly presented to the microcontroller 1008 so as to allow it to determine the priority of processing audio information. Any optical circuit can be used, including Industry Part No. DLR1160. Pin 1 of the optical circuit U4 presents the optical data. Pin 3 is preferably coupled to a voltage source, and, in this particular embodiment, it is electrically coupled to a first plate of a capacitor C19, a first plate of a capacitor C18, and a first port of an inductor L1. The capacitor C19 suitably includes a value of about 0.1 microfarad, and a second plate is coupled to digital ground. The capacitor C18 suitably includes a value of about 10 microfarads, and a second plate is coupled to digital ground. The inductor L1 suitably includes a value of about 10 microhenry, and a second port is coupled to a voltage source 3V3. The second pin of the optical circuit U4 is coupled to digital ground.

Pin 3 of the audio receiver U3 is adapted to receive audio information coming from the coaxial input. Pin 3 is electrically coupled to a first plate of a capacitor C15. The capacitor C15 suitably includes a value of about 0.1 microfarad, and a second plate is electrically coupled to a first port of a resistor R23, a first port of a resistor R25, and pin 6 of a transformer T1. The resistor R23 suitably includes a value of about 0 ohms, and a second port is electrically coupled to pin 1 of the transformer T1 and pin 1 of a jack J5. The resistor R25 suitably includes a value of about 200 ohms, and a second port is coupled to pin 4 of the transformer T1 and is also electrically coupled to a first port of a resistor R26. The resistor R26 suitably includes a value of about 0 ohms, and a second port is electrically coupled to pin 3 of the transformer T1 and pin 2 of the jack J5. Any suitable transformer can be used, including Industry Part No. TTWB1010.

The transformer T1 is used at this juncture to isolate noise coming from a high frequency digital interface facilitated by the jack J5 from analog audio information of the circuit 900. The jack J5 is a female fitting coupled to an electric circuit used with a plug to make a connection with another circuit, which in this case is the circuit 900. The jack J5 is adapted to receive high frequency digital information coming from a coaxial connection.

Returning to the circuit 400 of FIG. 4, port 2 of the knob RP1A is electrically coupled to pin 12 of an operational amplifier U12D. Any suitable operational amplifier can be used, including Industry Part No. LMV774. Pin 12 is the positive input into the operational amplifier U12D. Pin 4 of the operational amplifier U12D is coupled to the source voltage VCC, and pin 11 is coupled to analog ground. Pin 14 is the output of the operational amplifier U12D, and it is electrically coupled directly to pin 13, which is the negative input of the operational amplifier, thereby forming unity gain. Pin 14 of the operational amplifier U12D is electrically coupled to a first plate of a capacitor C76. The capacitor C76 suitably includes a value of about 1 microfarad, and a second plate is coupled to a first port of a resistor R91. The resistor R91 suitably includes a value of about 10.0 kilo-ohms, and a second port is coupled to a first port of a knob RP2A, RP2B. The knob RP2A, RP2B functions to provide control over the volume of audio information from both voice, game, and miscellaneous audio information. A second port of the knob RP2A is coupled to a first plate of a capacitor C72, a first plate of a capacitor C73, and pin 7 of an amplifier circuit U13. Any suitable amplifier circuit can be used, including Industry Part No. TPA6110A2. The capacitor C72 suitably includes a value of about 47 picofarads, and a second port is coupled to port 3 of the knob RP2A, pin 8, or the input into the amplifier circuit U13, as well as a first port of a resistor R95. The resistor R95 suitably includes a value of about 10.0 kilo-ohms, and a second port is electrically coupled to a first plate of a capacitor C77. The capacitor C77 suitably includes a value of about 1 microfarad, and a second plate is coupled to a first port of an inductor L8, which acts to squelch spurious noise. Any suitable inductor can be used, including Industry Part No. GZ1608D471. The second port of the inductor L8 is coupled to a first port of a diode-pair D22 as well as to a pin of a jack J9. The diode-pair D22 suitably can be chosen from any diode-pair, such as Industry Part No. PESD5VOS1. A second port of the diode-pair D22 is coupled to analog ground. The second port of the inductor L8 is adapted to receive rightward music information coming from one of the pins of the jack J9, which is a female fitting coupled to an electrical circuit used with a plug to make a connection with another circuit, such as the circuit 400. The jack J9 is adapted to interface with a digital music player, such as an mp3 digital music player. One of the pins of the jack J9 is coupled to analog ground. Another pin of the jack J9 is adapted to receive leftward music information coming from a digital music player, whose plug makes a connection with the jack J9. The signal that represents leftward music information coming from the jack J9 first encounters a first port of a diode-pair D21 and a first port of an inductor L7, which acts to squelch spurious noise. The diode-pair D21 suitably can be chosen from any diode-pair including Industry Part No. PESD5VOS1, and a second port is coupled to analog ground. The inductor L7 can be chosen from any suitable inductor, including Industry Part No. GZ1608D471, and a second port is coupled to a first plate of a capacitor C84. The capacitor C84 suitably includes a value of about 1 microfarad, and a second plate is coupled to a first port of a resistor R105. The resistor R105 suitably includes a value of about 10.0 kilo-ohms and a second port is coupled to pin 4 of the amplifier circuit U13, a first port of the knob RP2B, and is electrically coupled to a first plate of a capacitor C78. The capacitor C78 suitably includes a value of about 47 picofarads, and a second plate is coupled to pin 5 of the amplifier chip U13, which acts as a second output, is electrically coupled to a first plate of a capacitor C75 and is also electrically coupled to a third port of the knob RP2B. The second port of the knob RP2B is electrically coupled to a first port of a resistor R101. The resistor RIO suitably includes a value of about 10.0 kilo-ohms, and a second port is coupled to a first plate of a capacitor C81. The capacitor C81 suitably includes a value of 1 microfarad, and a second plate is coupled to pin 8 or an output of an operational amplifier U12C. Any suitable operational amplifier can be used, including Industry Part No. LMV774. Pin 4 of the operational amplifier U12C is coupled to the source voltage VCC, and pin 11 is coupled to analog ground. Pin 8 or the output of the operational amplifier U12C is directly connected to the negative input or pin 9 of the operational amplifier, thereby facilitating unity gain. Pin 10 or the positive input of the operational amplifier U12C is directly coupled to a second port of the knob RP1B.

Pin 1 of the amplifier circuit U13 is a bypass pin and is electrically coupled to first plate of a capacitor C82. The first plate of the capacitor C82 suitably includes a value of about 1 microfarad, and a second plate is coupled to analog ground as well as to pin 2, which is the ground pin of the amplifier circuit U13. Pin 3 of the amplifier circuit U13 is electrically coupled to a first port of a resistor R103. The resistor R103 suitably includes a value of about 10.0 kilo-ohms, and a second port is adapted to receive a signal SDHP coming from the microcontroller 1008. Pin 6 of the amplifier circuit U13 is adapted to receive the source voltage VCC.

The capacitor C73 suitably includes a value of about 330 microfarads, and a second plate is electrically coupled to a first port of a resistor R89, a first port of a diode-pair D1, and pin 3 of the jack J8 to present rightward audio information coming to the right headphone of the gamer audio gear. The resistor R89 suitably includes a value of about 10.0 kilo-ohms, and a second port is electrically coupled to analog ground. Any suitable diode-pair can be used for the diode-pair D1, including Industry Part No. PSD5VOS1. The second port of the diode-pair D1 is electrically coupled to analog ground.

The capacitor C75 suitably includes a value of about 330 microfarads, and a second plate is coupled to a first port of a resistor R93, a first port of a diode-pair D1, and is also electrically coupled to pin 4 of the jack J8 to present leftward audio information to the left headphone of the gamer audio gear. The resistor R93 suitably includes a value of about 10.0 kilo-ohms, and a second port is coupled to analog ground. The diode-pair D1 suitably can be chosen from any diode-pair, including Industry Part No. PESD5VOS1, and a second port is coupled to analog ground. Pin 5 of the jack J8 is electrically coupled to pin 4 of the jack J8. Pin 5 of the jack J8 presents the signal JK_DET to the microcontroller 1008 so as to allow the microcontroller 1008 to detect when the headphones of the gamer audio gear are connected to the circuit 400 of FIG. 4. Pin 2 of the jack J8 is connected to analog ground.

The signal MIC_LOCAL is presented at a first port of a resistor R129. The resistor R129 suitably includes a value of about 20.0 kilo-ohms, and a second port is coupled to pin 10 of an operational amplifier U11C and a first port of a resistor R130. The resistor R130 suitably includes a value of about 2 kilo-ohms, and a second port is coupled to analog ground. Any suitable operational amplifier can be used for the operational amplifier U11C, including Industry Part No. LMV774.

Pin 4 of the operational amplifier U11C is electrically coupled to the source voltage VCC, and pin 11 is coupled to analog ground. Pin 8 of the operational amplifier U11C is the output and is electrically coupled directly to the negative input of pin 9 of the operational amplifier, thereby forming unity gain. Electrically coupled to pin 8 of the operational amplifier U11C is a first port of a resistor R77 and a first port of a resistor R83. A second port of a resistor R77 is electrically coupled to a first port of a resistor R90 and a first plate of a capacitor C69. A second port of the resistor R90 is coupled to analog ground. The capacitor C69 suitably includes a value of about 10 microfarads, and a second plate is coupled to a first port of a resistor R79, as well as electrically coupled to a first port of an inductor L4, which acts to squelch spurious noise. The resistor R79 suitably includes a value of about 10.0 kilo-ohms, and a second port is coupled to analog ground. Any suitable inductor can be used, including Industry Part No. GZ1608D471 for the inductor L4. A second port of the inductor L4 is coupled to a first port of another inductor L15, as well as to a pin of the jack J10 that presents output signal to the Xbox LIVE equipment's voice channel. Any suitable inductor can be used for the inductor L15, including Industry Part No. GZ1608D471, and a second port is adapted to receive the signal MIC1_IN, thereby allowing the signal MIC1_IN to bypass the entirety of the circuit 400 and be presented directly to the Xbox LIVE equipment voice channel at the jack J10. The inductor L15 acts to squelch spurious noise.

The resistor R83's second port is electrically coupled to a first port of a resistor R84 and a first plate of a capacitor C71. A second port of the resistor R84 is coupled to analog ground. The capacitor C71 suitably includes a value of about 10 microfarads, and a second plate is coupled to a first port of a resistor R85 and a first port of an inductor L6, which acts to squelch spurious noise. The resistor R85 suitably includes a value of about 10.0 kilo-ohms, and a second port is coupled to analog ground. Any suitable inductor can be used for the inductor L6, including Industry Part No. GZ1608D471. The second port of the inductor L6 is coupled to a first port of a diode-pair D12 and to a first port of a resistor R128, as well as to one of the pins of jack J7. Any suitable diode-pair can be used, including Industry Part No. PESD5VOS1 for diode-pair D12. The second port of the diode-pair D12 is coupled to analog ground. The second port of the resistor R128 is coupled to another pin of the jack J7, and the remaining pin of the jack J7 is coupled to analog ground. The jack J7 is a female fitting coupled to an electric circuit used with a plug to make a connection with the circuit 400 to output PC headphone audio information.

While illustrative embodiments have been illustrated and described, it will be appreciated that various changes can be made therein without departing from the spirit and scope of the invention.

The invention claimed is:

1. A daisy-chainable game audio exchange comprising:
   a compression circuit for compressing or expanding a voice signal coming from a microphone of an audio gear of a first gamer to produce a first summand voice signal;
   social networking circuitry to combine the first summand voice signal, voice audio information of a second gamer as a second summand voice signal coming from a leftward daisy chain, and voice audio information of a third gamer as a third summand signal coming from rightward daisy chain network, to produce a combined voice signal for the first gamer,
   wherein the social networking circuitry is physically connected to the leftward daisy chain network and the rightward daisy chain network and communication therebetween does not utilize a wide area network.

2. The daisy-chainable game audio exchange of claim 1, further comprising a game system controller for amplifying a game system voice signal received from a piece of game system equipment, which is a fourth summand signal, the social networking circuitry combining the fourth summand signal with the combined voice signal to produce a second combined voice signal.

3. The daisy-chainable game audio exchange of claim 1, further comprising audio processing circuitry for producing a game audio signal, the audio processing circuitry being configured to receive an optical signal, coaxial signal, and RCA signals coming from a television, that is coupled to a game console, the optical signal being treated with high priority, the coaxial signal being treated with medium priority, and the RCA signals being treated with low priority.

4. The daisy-chainable game audio exchange of claim 3, further comprising a balance controller to define a percentage of the voice signal and a percentage of the game audio signal to combine to produce a balanced signal.

5. The daisy-chainable game audio exchange of claim 4, further comprising a volume controller into which music signals from a digital music player are received, the volume controller being configured to receive the balanced signal to produce an amplified signal for a left headphone and a right headphone of the gamer audio gear.

6. The daisy-chainable game audio exchange of claim 1, further comprising a secondary social networking circuitry to combine the first summand signal and the second summand signal coming from the leftward daisy chain network to output a resultant signal to the rightward daisy chain network.

7. The daisy-chainable game audio exchange of claim 6, further comprising a tertiary social networking circuitry to combine the first summand signal and the third summand signal coming from the rightward daisy chain network to output a resultant signal to the leftward daisy chain network.

8. A game audio exchanger including:
a headset connector for connecting to a headset of a first gamer and receiving a first voice signal therefrom;
a first exchanger jack for receiving a second voice signal from a second gamer via a physical and non-wide area network connection;
a second exchanger jack for receiving a third voice signal from a third gamer via a physical and non-wide area network connection;
a circuit for summing the first, second and third voice signals to produce a combined voice signal;
a game console connector for connecting to a game console of the first gamer and receiving game audio therefrom; and
a balance controller for facilitating control by the first gamer of a level of game audio delivered to the first gamer through the headset as compared to a level of combined voice signal that is delivered to the first gamer through the headset.

9. The game audio exchanger of claim 8, wherein the second voice signal received at the first exchanger jack includes both the second voice signal from the second gamer and a fourth voice signal from a fourth gamer.

10. The game audio exchanger of claim 9, wherein the third voice signal received at the second exchanger jack includes both the third voice signal from the third gamer and a fifth voice signal from a fifth gamer.

11. The game audio exchanger of claim 8, further comprising a music player connector for receiving music player audio therein.

12. A game audio exchange system for sharing of multiple gamer voice signals across a physical network comprising:
a first game audio exchanger including a first compression circuit for compressing or expanding a first voice signal coming from first audio gear of a first gamer to produce a first voice signal, a first exchanger jack and a second exchanger jack;
a second game audio exchanger including a second compression circuit for compressing or expanding a second voice signal coming from second audio gear of a second gamer to produce a second voice signal, a third exchanger jack and a fourth exchanger jack;
a third game audio exchanger including a third compression circuit for compressing or expanding a third voice signal coming from third audio gear of a third gamer to produce a third voice signal, a fifth exchanger jack and a sixth exchanger jack;
wherein the first exchanger jack is physically connected to at least one of the third exchanger jack and the fourth exchanger jack for receiving the second voice signal from the second game audio exchanger and the second exchanger jack is connected to at least one of the fifth exchanger jack and the sixth exchanger jack to receive the third voice signal from the third game audio exchanger; and
further wherein the first game audio exchanger includes a first summing circuit for summing the first, second and third voice signals into a first combined voice signal for the first gamer.

13. The game audio exchange system according to claim 12, wherein the second game audio exchanger includes a second summing circuit for summing the first, second and third voice signals into a second combined voice signal for the second gamer.

14. The game audio exchange system according to claim 13, wherein the third game audio exchanger includes a third summing circuit for summing the first, second and third voice signals into a third combined voice signal for the third gamer.

15. The game audio exchange system according to claim 14, wherein each of the first, second and third game audio exchangers includes a game console connector for connecting to a separate game console of each of the first, second and third gamers and receiving independent game audio therefrom from independent games being played by each of the first, second and third gamers on the separate game consoles.

16. The game audio exchange system according to claim 15, wherein each of the first, second and third game audio exchangers includes a balance controller for facilitating control by each of the first, second and third gamers of a level of respective game audio as compared to a level of combined first, second or third voice signal.

17. The game audio exchange system according to claim 12, wherein the physical network does not access a wide area network.

* * * * *